US012294685B2

(12) United States Patent
Mizuno et al.

(10) Patent No.: US 12,294,685 B2
(45) Date of Patent: May 6, 2025

(54) IMAGE PROCESSING APPARATUS, IMAGE GENERATING METHOD, AND STORAGE MEDIUM

(71) Applicant: CANON KABUSHIKI KAISHA, Tokyo (JP)

(72) Inventors: Shogo Mizuno, Tokyo (JP); Atsushi Date, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 185 days.

(21) Appl. No.: 17/367,655

(22) Filed: Jul. 6, 2021

(65) Prior Publication Data
US 2021/0337177 A1 Oct. 28, 2021

Related U.S. Application Data

(60) Division of application No. 16/293,045, filed on Mar. 5, 2019, now Pat. No. 11,089,284, which is a
(Continued)

(30) Foreign Application Priority Data

Sep. 14, 2016 (JP) .................. 2016-179529
Jun. 26, 2017 (JP) .................. 2017-124110

(51) Int. Cl.
*G06T 19/00* (2011.01)
*G06T 3/40* (2024.01)
(Continued)

(52) U.S. Cl.
CPC ............ *H04N 13/183* (2018.05); *G06T 7/20* (2013.01); *G06T 7/50* (2017.01); *G06T 7/70* (2017.01);
(Continued)

(58) Field of Classification Search
CPC .... H04N 13/183; H04N 13/111; H04N 5/247; H04N 5/2723; G06T 19/00; G06T 7/50;
(Continued)

(56) References Cited

U.S. PATENT DOCUMENTS 8,328,640 B2   12/2012 Rom et al.
8,866,848 B2   10/2014 Ishihara et al.
(Continued)

FOREIGN PATENT DOCUMENTS

CN       102598652 A    7/2012
JP       2009-516549 A  4/2009
(Continued)

OTHER PUBLICATIONS

Nov. 18, 2022 Chinese Official Action in Chinese Patent Appln. No. 201780056611.X.
(Continued)

*Primary Examiner* — Joseph W Becker
(74) *Attorney, Agent, or Firm* — Venable LLP

(57) ABSTRACT

It is an object of the present invention to reduce a possibility that a subject (specific object) of a virtual viewpoint image and a virtual object area overlap. To achieve the object, the present invention comprises a first identifying unit for identifying a three-dimensional position of the specific object captured respectively from different directions by a plurality of cameras; a second identifying unit for identifying a three-dimensional position of a virtual viewpoint related to generation of the virtual viewpoint image based on captured images obtained by the plurality of cameras; and a determining unit for determining a position of the virtual object area to which a virtual object to be displayed in the virtual viewpoint image is disposed, based on the three-dimensional position of the specific object identified by the first identifying unit and the three-dimensional position of
(Continued)

the virtual viewpoint identified by the second identifying unit.

18 Claims, 18 Drawing Sheets

Related U.S. Application Data continuation of application No. PCT/JP2017/030092, filed on Aug. 23, 2017.

(51) Int. Cl.
| | |
|---|---|
| *G06T 7/20* | (2017.01) |
| *G06T 7/50* | (2017.01) |
| *G06T 7/70* | (2017.01) |
| *H04N 13/111* | (2018.01) |
| *H04N 13/183* | (2018.01) |
| *H04N 23/90* | (2023.01) |
| *G06T 3/20* | (2006.01) |
| *H04N 5/272* | (2006.01) |

(52) U.S. Cl.
CPC ............ *G06T 19/00* (2013.01); *H04N 13/111* (2018.05); *G06T 3/20* (2013.01); *G06T 3/40* (2013.01); *G06T 2207/30221* (2013.01); *H04N 5/2723* (2013.01); *H04N 23/90* (2023.01)

(58) Field of Classification Search
CPC .... G06T 7/70; G06T 7/20; G06T 3/20; G06T 3/40; G06T 2207/30221
See application file for complete search history.

(56) References Cited

U.S. PATENT DOCUMENTS

| | | | |
|---|---|---|---|
| 8,928,755 | B2 | 1/2015 | Kotani |
| 8,943,535 | B2 | 1/2015 | Sakamoto et al. |
| 9,142,052 | B1* | 9/2015 | Caine ..................... G06T 3/40 |
| 10,074,182 | B2 | 9/2018 | Faaland et al. |
| 10,547,798 | B2 | 1/2020 | Douris et al. |
| 2006/0105841 | A1 | 5/2006 | Rom et al. |
| 2012/0200600 | A1* | 8/2012 | Demaine ............ G06F 3/04883 |
| | | | 345/633 |
| 2014/0059588 | A1* | 2/2014 | Sakamoto ............ H04N 21/472 |
| | | | 725/32 |
| 2014/0340404 | A1 | 11/2014 | Wang et al. |
| 2016/0098860 | A1* | 4/2016 | Basra .................... H04L 67/131 |
| | | | 345/633 |
| 2018/0303558 | A1 | 10/2018 | Thomas |
| 2019/0199997 | A1 | 6/2019 | Mizuno et al. |

FOREIGN PATENT DOCUMENTS

| | | |
|---|---|---|
| JP | 2012-048639 A | 3/2012 |
| JP | 2012-128779 A | 7/2012 |
| JP | 2014-032443 A | 2/2014 |
| JP | 2014-041259 A | 3/2014 |
| JP | 2015-022589 A | 2/2015 |
| JP | 2016-066149 A | 4/2016 |
| JP | 2016-126425 A1 | 7/2016 |
| JP | 2018-049591 A | 3/2018 |
| WO | 2007/120277 A2 | 10/2007 |
| WO | 2013/001902 A1 | 1/2013 |
| WO | 2018/051747 A1 | 3/2018 |

OTHER PUBLICATIONS

Yuanzhi Lyu, et al., "Two dimensional multiview image array pickup and virtual viewpoint image synthesis algorithm," Journal of Harbin Engineering University, vol. 34, No. 6 (Jun. 2013), pp. 763-767, 795.
Oct. 24, 2017 International Search Report and Written Opinion in International Patent Appln. No. PCT/JP2017/030092.
Mar. 19, 2019 International Preliminary Report on Patentability in International Patent Appln. No. PCT/JP2017/030092.
Feb. 18, 2020 European Search Report in European Patent Appln. No. 17850652.3.
May 7, 2020 Korean Official Action in Korean Patent Appln. No. 10-2019-7009810.
Jun. 19, 2018 Japanese Official Action in Japanese Patent Appln. No. 2017-124110.
Mar. 16, 2021 Japanese Official Action in Japanese Patent Appln. No. 2020-012357.
Jun. 2, 2021 Korean Official Action in Korean Patent Appln. No. 10-2021-7007783.

* cited by examiner

IMAGE PROCESSING APPARATUS, IMAGE GENERATING METHOD, AND STORAGE MEDIUM

CROSS-REFERENCE TO RELATED APPLICATIONS

This application is a division of U.S. patent application Ser. No. 16/293,045 filed Mar. 5, 2019, which is a continuation of International Patent Application No. PCT/JP2017/030092, filed Aug. 23, 2017, which claims the benefit of Japanese Patent Application No. 2016-179529, filed Sep. 14, 2016, and Japanese Patent Application No. 2017-124110, filed Jun. 26, 2017, all of which are hereby incorporated by reference herein in their entirety.

BACKGROUND OF THE INVENTION

Field of the Invention

The present invention relates to an image processing apparatus, an image generating method, and a storage medium.

Description of the Related Art

In recent years, a technique of installing a plurality of cameras at different positions, performing synchronous image capture with multiple viewpoints, and generating not only images at the camera installation positions but also virtual viewpoint images from arbitrary viewpoints by using a plurality of viewpoint images obtained by the capture attracts attention. Here, it is possible to realize the generation of the virtual viewpoint images based on the plurality of viewpoint images and browsing of the generated images by collecting the images captured by the plurality of cameras in an image processing unit such as a server or the like, performing a process such as rendering or the like to the collected images based on virtual viewpoints in the image processing unit, and displaying the obtained virtual viewpoint images on a user's viewing terminal.

Japanese Patent Application Laid-Open No. 2014-41259 discloses a technique of providing an advertisement frame in a predetermined area such as a wall surface of a stadium in soccer-stadium relay broadcast or the like, and displaying advertisement information corresponding to a viewing environment to the advertisement frame in video data of a virtual viewpoint including the advertisement frame.

However, there is a fear that an advertisement area overlaps a subject such as a soccer player or the like. For example, if the subject and the advertisement area overlap each other due to a movement of the subject, there is a fear that an advertisement is not displayed. Besides, for example, if the subject and the advertisement area overlap each other due to a movement of a virtual viewpoint, there is a fear that the advertisement is not displayed. A similar problem may arise in a case where not only the advertisement but also another virtual object is displayed in a virtual viewpoint image.

The present invention has been completed in view of such problems, and it is an object thereof to reduce a possibility that the subject (specific object) of the virtual viewpoint image and a virtual object area overlap each other.

SUMMARY OF THE INVENTION

Therefore, the present invention is characterized by comprising: a first identifying unit configured to identify a three-dimensional position of a specific object captured respectively from different directions by a plurality of cameras; a second identifying unit configured to identify a three-dimensional position of a virtual viewpoint related to generation of a virtual viewpoint image based on captured images obtained by the plurality of cameras; and a determining unit configured to determine a position of a virtual object area to which a virtual object to be displayed in the virtual viewpoint image is disposed, based on the three-dimensional position of the specific object identified by the first identifying unit and the three-dimensional position of the virtual viewpoint identified by the second identifying unit.

Further features of the present invention will become apparent from the following description of exemplary embodiments with reference to the attached drawings.

DESCRIPTION OF THE EMBODIMENTS

Hereinafter, preferred embodiments of the present invention will be described with reference to the attached drawings.

First Embodiment

Figure 1:
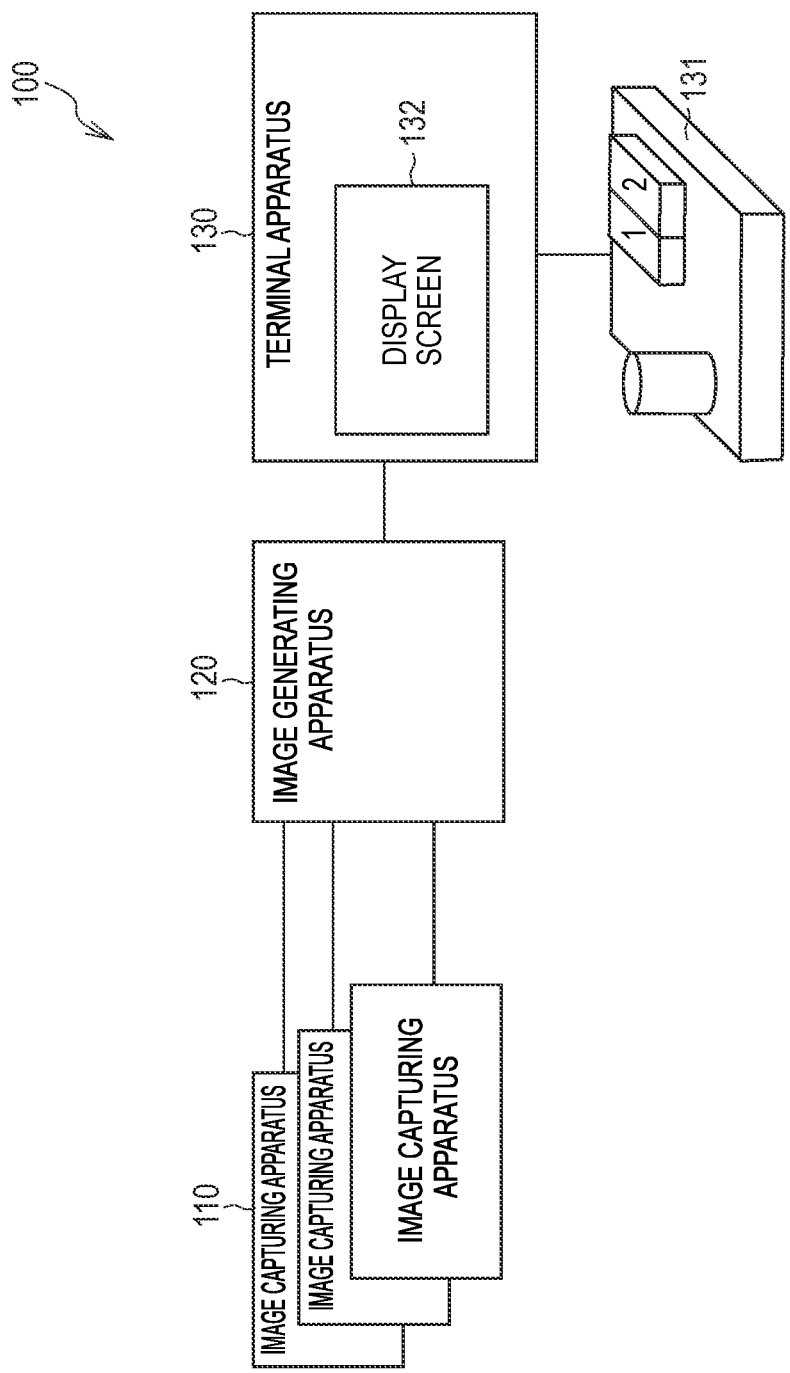
FIG. 1 is a diagram for describing an image processing system.

FIG. 1 is a diagram for describing an image processing system 100 according to the present embodiment. The image processing system 100 comprises a plurality of image capturing apparatuses 110, an image generating apparatus 120 which is an example of an image processing apparatus, and a terminal apparatus 130. Each of the image capturing apparatuses 110 and the image generating apparatus 120 are connected via a communication cable such as a LAN (Local Area Network) cable or the like. In the present embodiment, it is assumed that the communication cable is the LAN cable, but the communication cable is not limited to that in the embodiment. As another example, it is assumed that the communication cable may be a video transmission cable such as a DisplayPort, an HDMI™ (High Definition Multimedia Interface) or the like.

Figure 2:
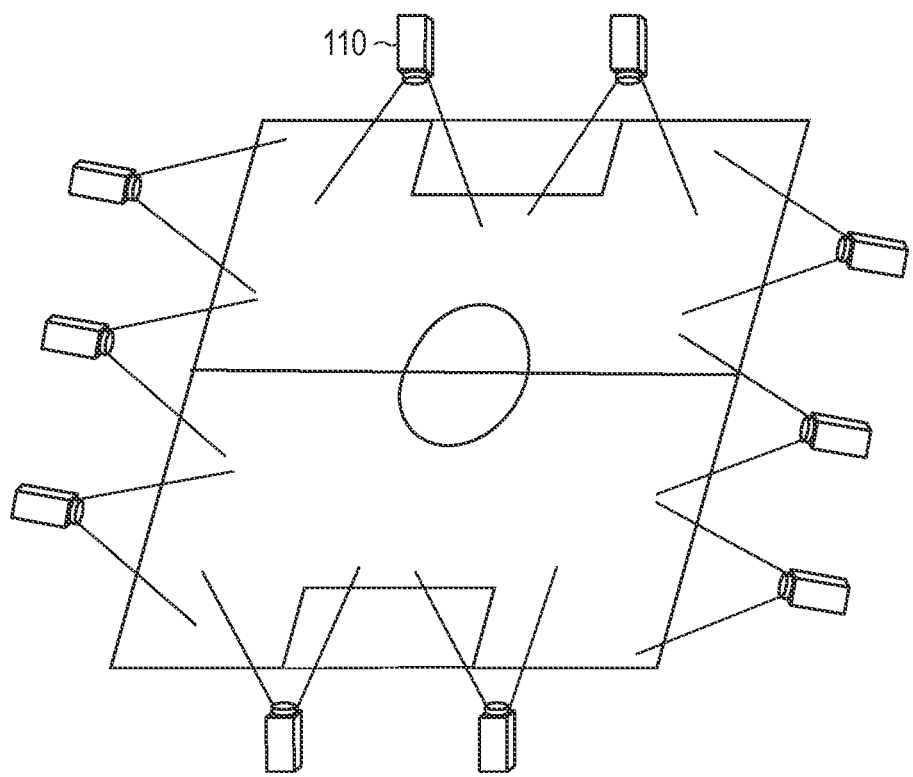
FIG. 2 is a diagram for describing an installation example of image capturing apparatuses.

The image capturing apparatus 110 is a digital camera capable of capturing an image (still image and moving image), for example. Each image capturing apparatus 110 is installed so as to surround a stadium such as a soccer field or a specific subject, and captures an image (video). The captured image is transmitted from the image capturing apparatus 110 to the image generating apparatus 120. FIG. 2 is a diagram for describing an installation example of the image capturing apparatuses 110. In the present embodiment, it is assumed that the plurality of image capturing apparatuses 110 are installed so as to capture the whole or a part of the soccer field. That is, the image processing system 100 according to the present embodiment includes the plurality of image capturing apparatuses 110 for capturing a subject respectively from a plurality of directions.

The image generating apparatus 120 accumulates the captured images obtained by the image capturing apparatuses 110, and, when virtual viewpoint information is input on the terminal apparatus 130 by a user's operation, generates a virtual viewpoint image based on the captured image and a virtual viewpoint. Here, the virtual viewpoint information is information indicating a three-dimensional position of a virtually set viewpoint (virtual viewpoint) in a virtual space constructed from the captured images. It is assumed that the virtual viewpoint information includes at least position information of a relative position with respect to a predetermined position such as the center of the captured stadium or the like, that is, position information of front and rear, left and right, and right and left with respect to the predetermined position, and direction information of a direction from the predetermined position, that is, direction information of angles around front and rear, left and right, and up and down.

The image generating apparatus 120 is, for example, a server apparatus, and has a database function and an image processing function. In a database, as a background image, an image obtained by capturing a scene of a competition venue where a subject does not exist beforehand because a game is not yet started is previously held via the image capturing apparatus 110. Besides, in a scene in which a subject such as a competitor during a competition exists, a foreground of a specific object or the like to be the subject is separated by an image process and held as a specific object image. Incidentally, the specific object may be not only the competitor during the competition but also another specific person (for example, a reserve, a director, a referee, etc.). Also, the specific object may be an object such as a ball or a goal for which an image pattern is predetermined.

It is assumed that the virtual viewpoint image corresponding to the virtual viewpoint information is generated from the background image and the specific object image managed in the database. For example, model-based rendering (MBR) is used as a generating method of the virtual viewpoint image. The MBR is a method of generating the virtual viewpoint image by using a three-dimensional model generated based on a plurality of captured images obtained by capturing the subject from a plurality of directions. More specifically, the MBR is a technique of generating, as an image, appearance of a scene from the virtual viewpoint by using a three-dimensional shape (model) of a target scene obtained by a three-dimensional shape restoring method such as a visual hull, a multi-view-stereo (MVS) or the like. Incidentally, as the generating method of the virtual viewpoint image, a rendering method other than the MBR may be used. The generated virtual viewpoint image is transmitted to the terminal apparatus 130 via a LAN cable or the like.

The terminal apparatus 130 is, for example, a PC (Personal Computer) or a tablet. A controller 131 is, for example, a mouse, a keyboard, a six-axis controller and a touch panel, and a user performs operations by using them, and displays a still image or a moving image on a screen. For example, the terminal apparatus 130 displays the virtual viewpoint image received from the image generating apparatus 120 on a display screen 132. The terminal apparatus 130 further accepts an instruction to move the virtual viewpoint (instruction related to movement amount and movement direction) in accordance with the user's operation with respect to the connected controller 131, and transmits a transmission signal indicating instruction information according to the accepted instruction to the image generating apparatus 120.

Incidentally, in the present embodiment, an example in which the virtual viewpoint image generated based on the virtual viewpoint set by the terminal apparatus 130 is displayed on the terminal apparatus 130 will be mainly described, but the present invention is not limited thereto. For example, the virtual viewpoint image generated based on the virtual viewpoint set by the terminal apparatus 130 may be displayed by another terminal apparatus 130 (e.g., smartphone) or the like.

Figure 3:
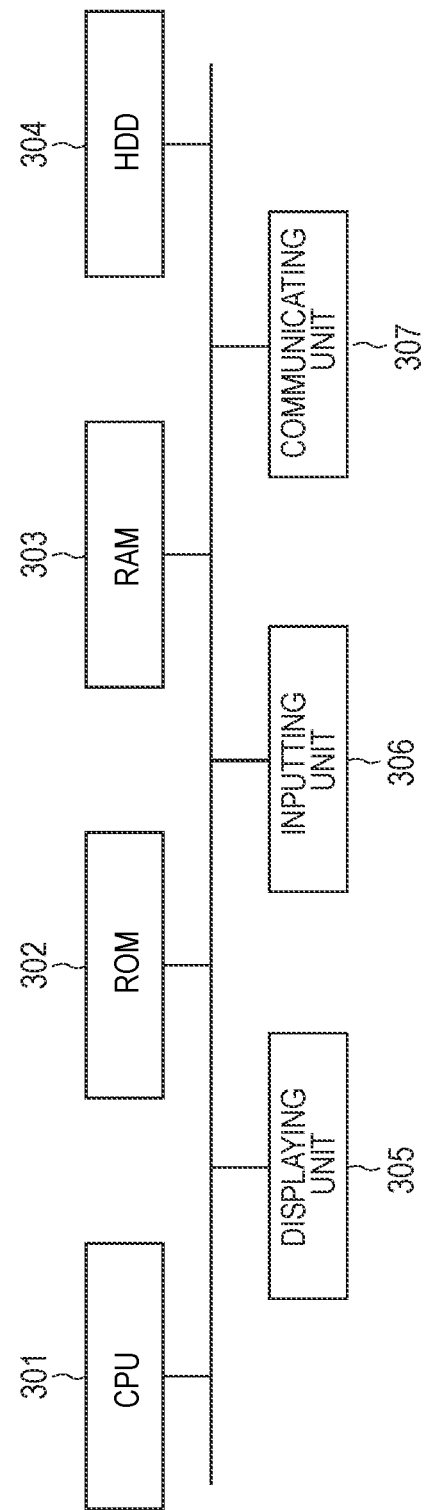
FIG. 3 is a diagram for describing a hardware constitution of an image generating apparatus.

FIG. 3 is a diagram for describing a hardware constitution of the image generating apparatus 120. The image generating apparatus 120 comprises a CPU 301, a ROM 302, a RAM 303, an HDD 304, a displaying unit 305, an inputting unit 306, and a communicating unit 307. The CPU 301 reads control programs stored in the ROM 302, and executes various processes. The RAM 303 is used as a temporary storage area such as a main memory, a work area and the like of the CPU 301. The HDD 304 stores various data, various programs and the like. The displaying unit 305 displays various kinds of information. The inputting unit 306 includes a keyboard and a mouse, and accepts various operations by the user. The communicating unit 307 performs a communication process with an external apparatus such as an image forming apparatus via a network. Incidentally, as the network, the Ethernet™ can be used. As another example, the communicating unit 307 may communicate with an external apparatus wirelessly.

The functions and processes of the image generating apparatus 120, which will be described later using flowcharts and the like, are realized by the CPU 301 which reads programs stored in the ROM 302 or the HDD 304 and executes the read programs. However, it is also possible to realize all or part of the functions and processes of the image generating apparatus 120 by dedicated hardware. In this case, the CPU 301 of the image generating apparatus 120 controls the dedicated hardware, thereby realizing each function and process described later. Besides, the hardware constitution of the terminal apparatus 130 is similar to the hardware constitution of the image generating apparatus 120. That is, the functions and processes of the terminal apparatus 130, which will be described later using the flowcharts and the like, may be realized by the CPU 301, or part or whole of the functions and processes thereof may be realized by dedicated hardware.

Figure 4:
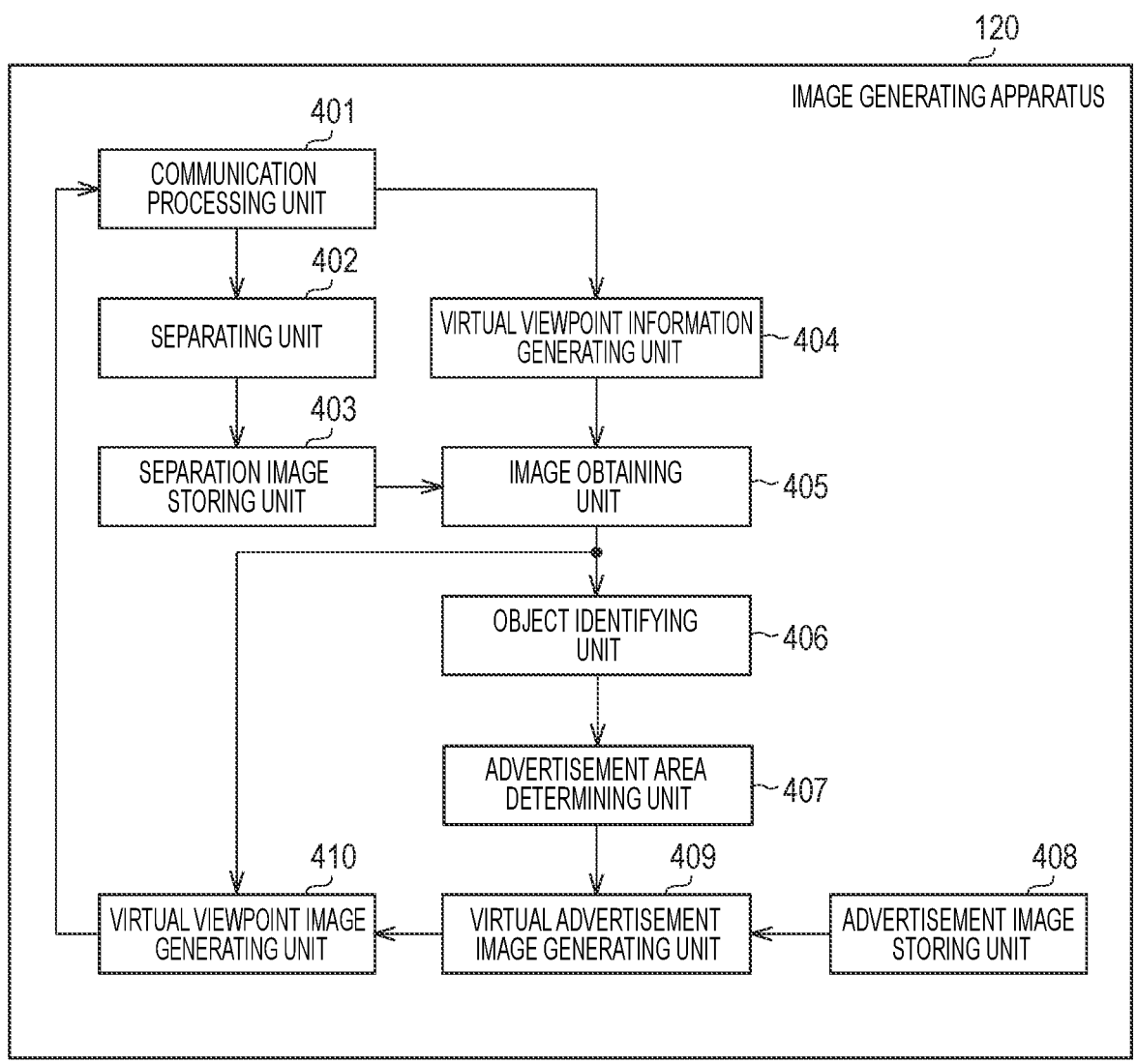
FIG. 4 is a diagram for describing a functional configuration of the image generating apparatus.

FIG. 4 is a diagram for describing a functional configuration of the image generating apparatus 120. The image generating apparatus 120 comprises a communication processing unit 401, a separating unit 402, a separation image storing unit 403, a virtual viewpoint information generating unit 404, and an image obtaining unit 405. The image generating apparatus 120 further comprises an object identifying unit 406, an advertisement area determining unit 407, an advertisement image storing unit 408, a virtual advertisement image generating unit 409, and a virtual viewpoint image generating unit 410.

The communication processing unit 401 controls transmission and reception of information between the image generating apparatus 120 and the terminal apparatus 130. For example, the communication processing unit 401 converts a transmission signal received from the terminal apparatus 130 into instruction information. For example, the instruction information is user operation information which is composed of change amounts of position information (x, y, z) indicating a position of the virtual viewpoint in the virtual viewpoint image and direction information (rx, ry, rz) indicating a virtual capturing direction. The communication processing unit 401 also converts a transmission signal received from the image capturing apparatus 110 into data of a captured image.

The separating unit 402 separates, from the captured images received via the communication processing unit 401, an image obtained by capturing a scene of a competition venue in a state that a specific subject (specific object) does not exist because a game is not yet started, and records the separated image as the background image in the separation image storing unit 403. Further, the separating unit 402 extracts the specific subject such as a player or the like from an image captured during a competition, and records an image of the extracted specific subject as a specific object image. The separation image storing unit 403 stores the background image and the specific object image. Incidentally, the separation image storing unit 403 stores the background image and the specific object image together with capturing position information indicating a capturing position (three-dimensional position) in the world coordinate system (three-dimensional coordinate system) of a capturing space. That is, the three-dimensional position is defined by a position in each direction corresponding to a height, a width and a depth in the capturing space. The capturing position information with respect to the world coordinate system is obtained, for example, by capturing a marker or the like previously set and performing three-dimensional image measurement or the like of the marker.

The virtual viewpoint information generating unit 404 generates virtual viewpoint information (x, y, z, rx, ry, rz) from change amounts of the position and the direction included in the instruction information accepted by the communication processing unit 401. Here, the virtual viewpoint information is information obtained by adding or subtracting the change amount included in the instruction information to or from the virtual viewpoint information before change, using, e.g., the center of the stadium as the origin. The image obtaining unit 405 obtains from the separation image storing unit 403 a plurality of specific object images and background images corresponding to the virtual viewpoint information generated by the virtual viewpoint information generating unit 404. Based on the specific object image obtained by the image obtaining unit 405, the object identifying unit 406 identifies a position and a size of the specific object in the capturing space. The object identifying unit 406 generates specific object information indicating the position and the size of the specific object.

Based on the virtual viewpoint information generated by the virtual viewpoint information generating unit 404 and the specific object information generated by the object identifying unit 406, the advertisement area determining unit 407 determines a position (arrangement position) at which an advertisement area is disposed in the capturing space. Here, the advertisement area is an area for displaying an advertisement image. The advertisement image storing unit 408 stores the advertisement image. Here, the advertisement image is an image including a company name logo, a product logo, a product image and the like. Incidentally, the advertisement image is not limited to that in the embodiment. The virtual advertisement image generating unit 409 disposes the advertisement image stored in the advertisement image storing unit 408, in the advertisement area determined by the advertisement area determining unit 407, thereby generating a virtual advertisement image in which an advertisement is disposed at a predetermined virtual position as seen from the virtual viewpoint. Incidentally, in the present embodiment, the virtual viewpoint image in which the advertisement image is disposed is generated, but the image to be disposed in the virtual viewpoint image is not limited to the advertisement image, and another virtual object may be used. Here, the advertisement image is an example of a virtual object, and the advertisement area is an example of a virtual object area.

The virtual viewpoint image generating unit 410 generates the virtual viewpoint image based on the specific object image and the background image obtained by the image obtaining unit 405 and the virtual advertisement image generated by the virtual advertisement image generating unit 409. That is, the virtual viewpoint image generated by the virtual viewpoint image generating unit 410 includes the advertisement image. The virtual viewpoint image generated by the virtual viewpoint image generating unit 410 is converted into a transmission signal which can be transmitted by the communication processing unit 401, and transmitted to the terminal apparatus 130.

Figure 5:
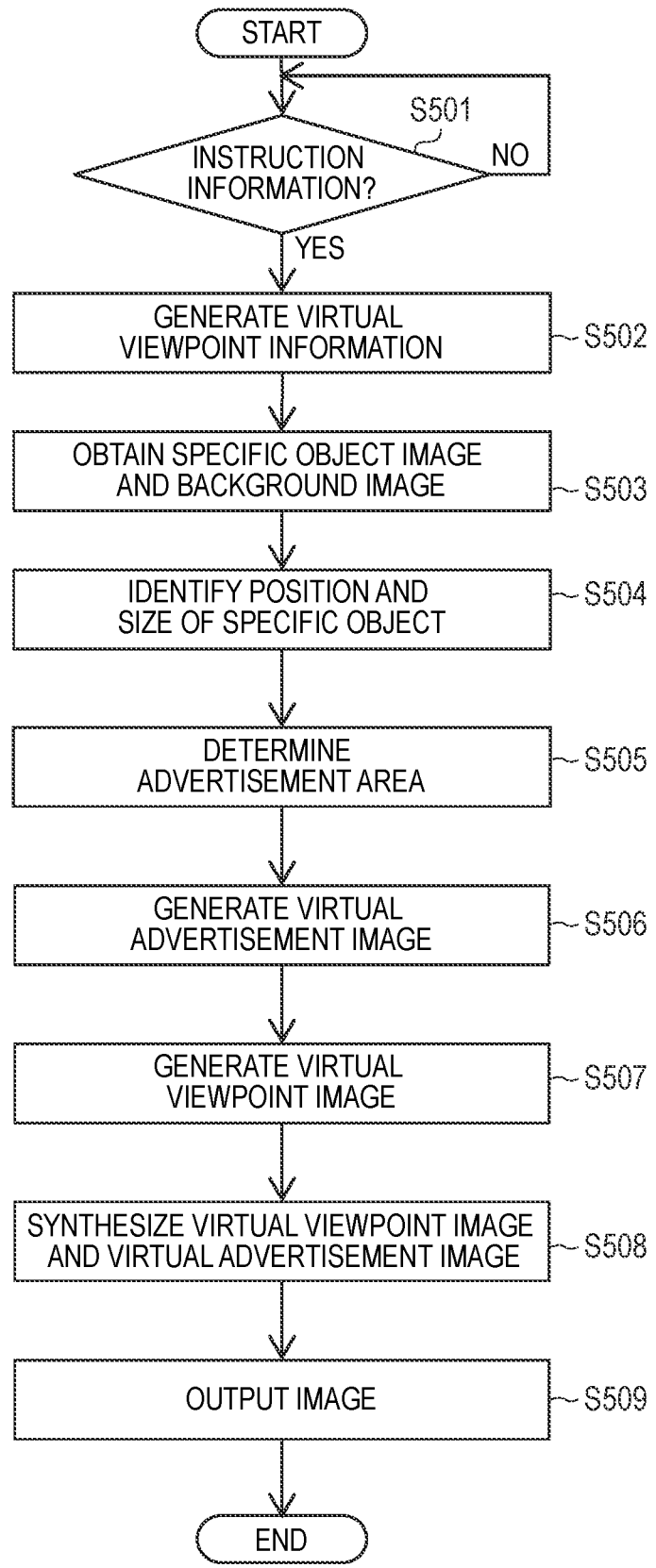
FIG. 5 is a flowchart for describing an image process.

FIG. 5 is a flowchart for describing an operation in image process to be performed by the image generating apparatus 120. In S501, the communication processing unit 401 confirms whether or not the instruction information is received from the terminal apparatus 130. When receiving the instruction information (YES in S501), the communication processing unit 401 advances the process to S502. In S502, the virtual viewpoint information generating unit 404 generates the virtual viewpoint information based on the instruction information. Next, in S503, the image obtaining unit 405 obtains the plurality of specific object images and the background image necessary for generating the virtual viewpoint image corresponding to the virtual viewpoint information from the separation image storing unit 403. Incidentally, the image obtaining unit 405 obtains image data obtained from at least the two or more image capturing apparatuses 110 which are close to the position of the virtual viewpoint information.

Next, in S504, the object identifying unit 406 identifies the position and the size of the specific object in the capturing space by using a three-dimensional image analyzing method with respect to the images captured by the plurality of image capturing apparatuses 110. Incidentally, the process for identifying the position and the size of the specific object is not limited to that in the embodiment.

Next, in S505, the advertisement area determining unit 407 determines the arrangement position of the advertisement area based on the specific object information and the virtual viewpoint information. More specifically, the advertisement area determining unit 407 determines a position at which the specific object image and the virtual advertisement image do not overlap in the virtual viewpoint image, as the arrangement position of the advertisement area. This process will be described later with reference to FIGS. 6A and 6B and FIGS. 7A and 7B. Next, in S506, the virtual advertisement image generating unit 409 disposes the advertisement image stored in the advertisement image storing unit 408, at the arrangement position of the advertisement area determined by the advertisement area determining unit 407, thereby generating the virtual advertisement image.

Next, in S507, the virtual viewpoint image generating unit 410 generates the virtual viewpoint image based on the specific object image and the background image obtained by the image obtaining unit 405. Next, in S508, the virtual viewpoint image generating unit 410 generates the virtual viewpoint image in which the advertisement is disposed, by synthesizing the virtual viewpoint image generated in S507 and the virtual advertisement image generated in S506. Next, in S509, the communication processing unit 401 transmits (outputs) the virtual viewpoint image (display image) obtained in S508 to the terminal apparatus 130. Thus, the image process ends.

Figure 6A:
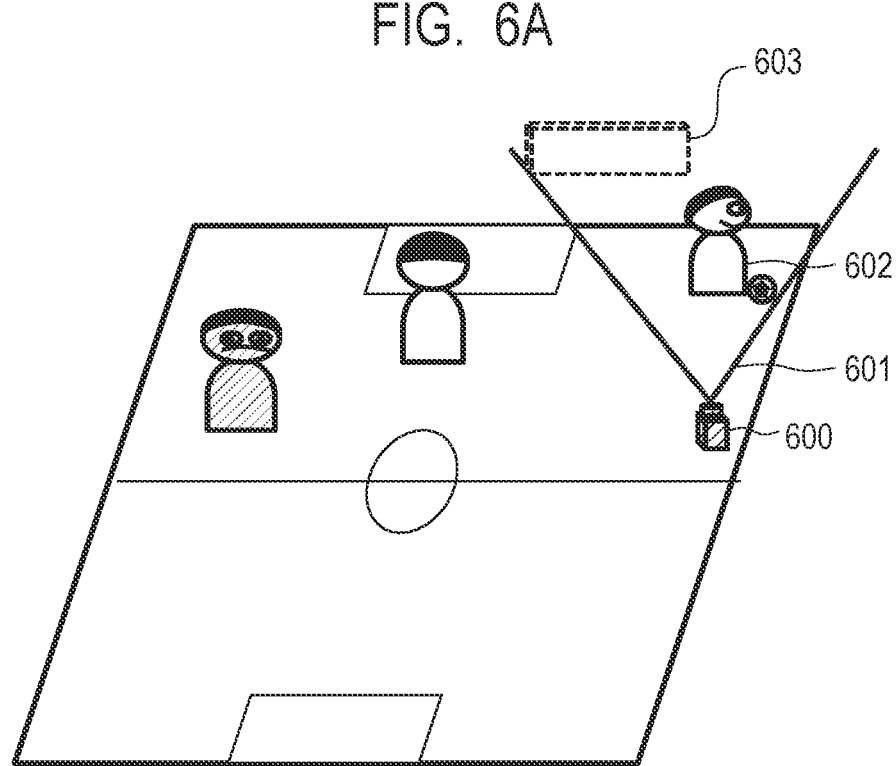
FIG. 6A is an explanatory diagram of an advertisement area determining process.
Figure 6B:
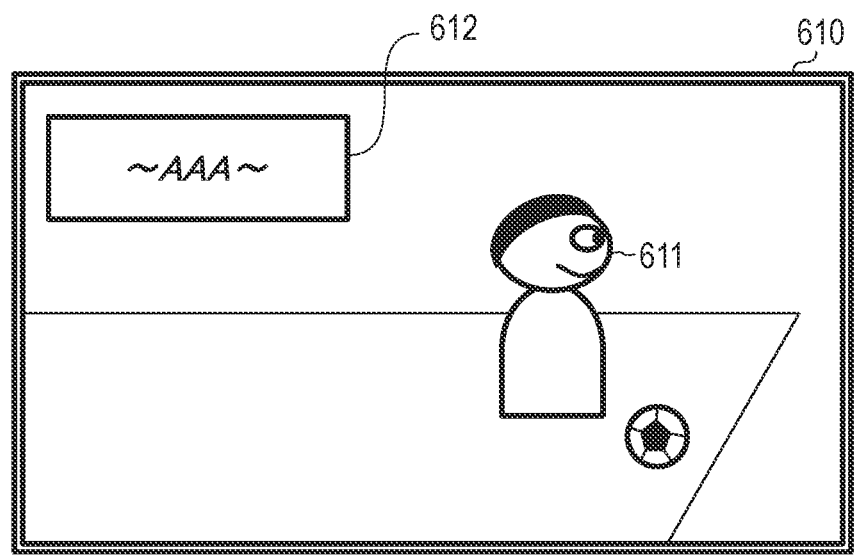
FIG. 6B is an explanatory diagram of the advertisement area determining process.

FIGS. 6A and 6B and FIGS. 7A and 7B are the explanatory diagrams of the advertisement area determining process (S505). In FIG. 6A, a virtual viewpoint 600, a virtual capturing range 601, a specific object 602 and an advertisement area 603 are conceptually shown. In the example of FIG. 6A, as seen from the virtual viewpoint 600, the position on the right side of the virtual capturing range 601 and behind in the capturing direction relative to the specific object 602 is determined as the arrangement position of the specific object 602. FIG. 6B is the diagram for describing a virtual viewpoint image 610 corresponding to FIG. 6A. In the virtual viewpoint image 610, a virtual advertisement image 612 is disposed on the left side of the specific object image 611 without overlapping a specific object image 611.

Figure 7A:
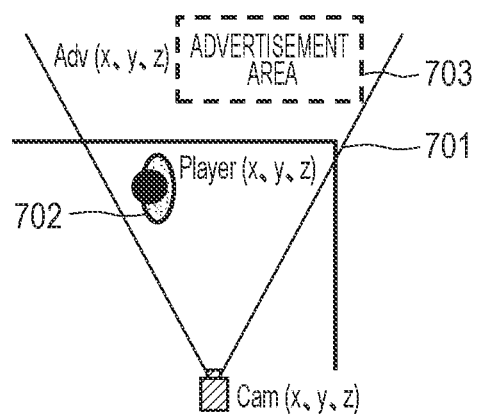
FIG. 7A is an explanatory diagram of the advertisement area determining process.
Figure 7B:
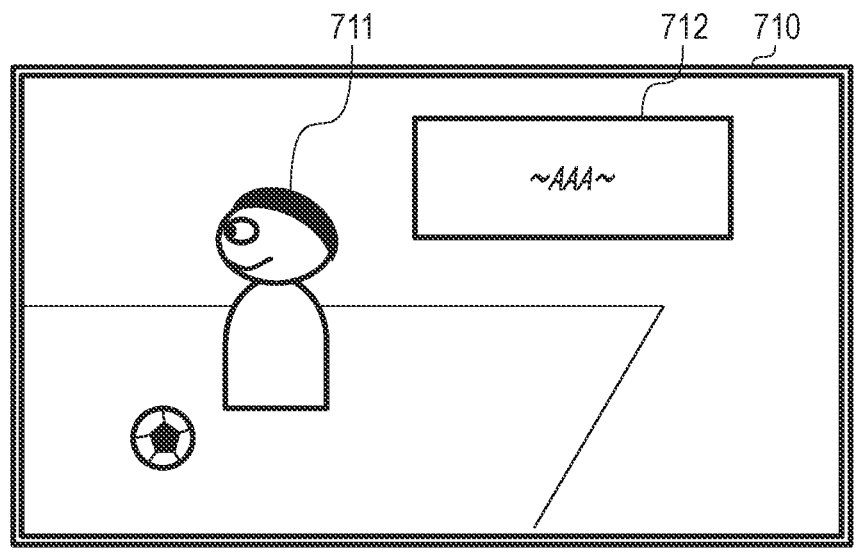
FIG. 7B is an explanatory diagram of the advertisement area determining process.

Further, as shown in FIG. 7A, it is assumed that a specific object 702 is positioned on the left side of a capturing range 701. In this case, the advertisement area determining unit 407 determines the position on the right side of and at the rear of the specific object 702 as the position of an advertisement area 703. FIG. 7B is the diagram for describing a virtual viewpoint image 710 corresponding to FIG. 7A. In the virtual viewpoint image 710, a virtual advertisement image 712 is disposed on the right side of a specific object image 711 without overlapping the specific object image 711.

As described above, the image generating apparatus 120 according to the first embodiment determines the position not overlapping the specific object (subject) as the advertisement area, and disposes the virtual advertisement image in the advertisement area. More specifically, the image generating apparatus 120 determines the advertisement area based on the position of the virtual viewpoint in the three-dimensional space and the position of the specific object in the three-dimensional space. Incidentally, the three-dimensional space in the present embodiment is a space which is identified by, for example, a height direction (gravity direction), a width direction and a depth direction in a space (for example, a stadium such as a soccer field) being a capturing target by the plurality of image capturing apparatuses 110. This three-dimensional space can be represented by the three-dimensional coordinates using, for example, the center of the stadium as the origin. According to the above constitution, it is possible to prevent that a part or whole of the advertisement image is not displayed because the subject overlaps the advertisement image. That is, it is possible to reduce a loss of display opportunity of the advertisement image. In other words, the image generating apparatus 120 can appropriately dispose the advertisement image in the virtual viewpoint image.

Figure 8A:
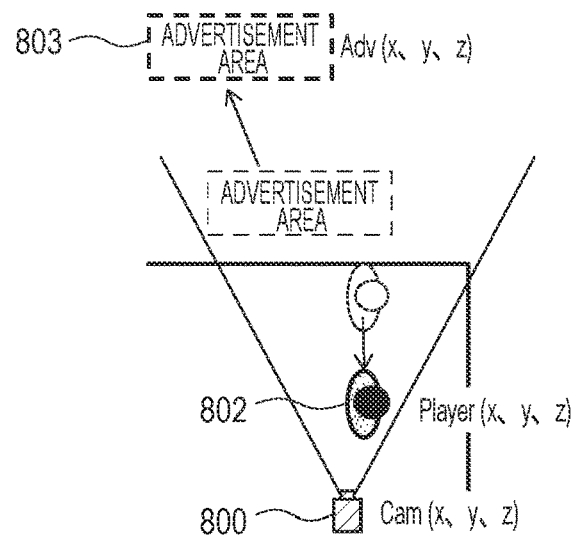
FIG. 8A is an explanatory diagram of a modified example.

As a first modified example, the image generating apparatus 120 may change the position of the advertisement area according to a movement of the specific object. More specifically, the image generating apparatus 120 detects the movement of the object based on each frame of video. As shown in FIG. 8A, when a movement of a specific object 802 in the direction approaching a virtual viewpoint 800 is detected, the image generating apparatus 120 changes the position of an advertisement area 803 to a further rear position.

Figure 8B:
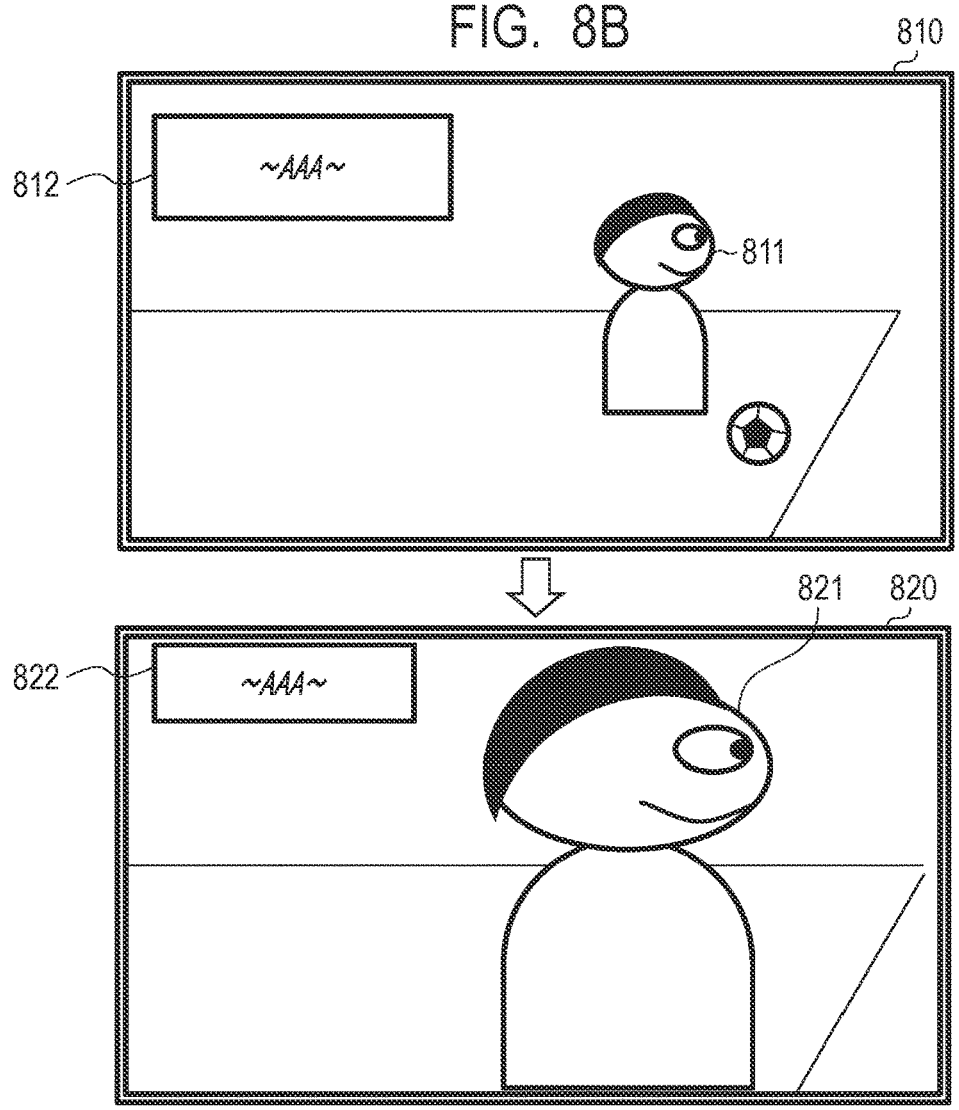
FIG. 8B is an explanatory diagram of the modified example.

FIG. 8B is a diagram for describing a change of the virtual viewpoint image according to the movement of the specific object 802. In accordance with the movement of the specific object 802, the virtual viewpoint image changes from the virtual viewpoint image 810 to the virtual viewpoint image 820. That is, a virtual viewpoint image 810 corresponds to the state before the movement of the specific object 802 in FIG. 8A, and a virtual viewpoint image 820 corresponds to the state after the movement of the specific object 802 in FIG. 8A. A specific object image 821 of the virtual viewpoint image 820 is displayed larger than a specific object image 811 of the virtual viewpoint image 810. On the other hand, a virtual advertisement image 822 of the virtual viewpoint image 820 is displayed smaller than a virtual advertisement image 812 of the virtual viewpoint image 810. Moreover, in this case, the image generating apparatus 120 may perform an image process of giving a sense of distance, such as blurring, shading or the like to the virtual advertisement image 822 as compared with the virtual advertisement image 812.

More specifically, the image generating apparatus 120 determines the position of the advertisement area in the capturing direction according to the distance between the virtual viewpoint and the specific object. For example, as the distance between the virtual viewpoint and the specific object becomes shorter, the image generating apparatus 120 determines a further rear position as the position of the advertisement area. Incidentally, it is assumed that the image generating apparatus 120 determines the position of the advertisement area from, for example, a relational expression indicating a relationship between the distance between the virtual viewpoint and the specific object and the position of the advertisement area. In this case, it is assumed that relational expression is previously stored in the HDD 304 of the image generating apparatus 120. As another example, the image generating apparatus 120 may determine the position of the advertisement area with reference to a correspondence table in which the distance between the virtual viewpoint and the specific object and the position of the advertisement area are associated with each other. In this case, it is assumed that the correspondence table is previously stored in the HDD 304 of the image generating apparatus 120. Besides, at this time, the image generating apparatus 120 may also change a position in another direction in addition to the position in the capturing direction of the advertisement area, in accordance with the distance between the virtual viewpoint and the specific object.

In this way, as the specific object approaches the virtual viewpoint, the image generating apparatus 120 changes the position of the advertisement area to a further rear position. Thus, it is possible to prevent that a part or whole of the virtual advertisement image is not displayed even in the case where the specific object is moving in a direction approaching the virtual viewpoint.

The image generating apparatus 120 detects the movement direction of the specific object, and changes the position of the advertisement area according to the detected result. However, this operation is not limited to the case where the specific object moves toward the virtual viewpoint. For example, in a case where the specific object moves in the direction of the advertisement area, the image generating apparatus may change the position of the advertisement to a further rear position, or may change the position of the advertisement area in a direction away from the specific object.

As a second modified example, instead of determining the arrangement position of the advertisement area in the capturing space, the image generating apparatus 120 may determine an arrangement position of the advertisement area in the virtual viewpoint image. In this case, the image generating apparatus 120 may generates a virtual viewpoint image not including an advertisement image based on the virtual viewpoint information, and determine a position which does not overlap the specific object image in the virtual viewpoint image as the position of the advertisement area. Then, the image generating apparatus 120 obtains a virtual viewpoint image on which the advertisement image is displayed, by superimposing the virtual advertisement image on the advertisement area. Further, the image generating apparatus 120 may determine the size of the advertisement area in addition to the arrangement position of the advertisement area in the virtual viewpoint. For example, in a case where a space for disposing the advertisement area of an initial size cannot be secured, the image generating apparatus 120 may set the size of the advertisement area to a smaller size. According to the second modified example, rather than determining the arrangement position of the advertisement area in a three-dimensional space, it is possible to reduce a processing load related to determination of the advertisement area based on the position of the virtual viewpoint in the three-dimensional space and the position of the specific object.

As a third modified example, instead of generating the virtual viewpoint information according to the user's operation, the image generating apparatus 120 may automatically generate such virtual viewpoint information as tracking a specific object such as a specific player, a ball or the like.

As a fourth modified example, the image processing apparatus 120 may sequentially change the position of the advertisement area for each frame of a moving image as the virtual viewpoint image, or after changing the position once, may fix the position of the advertisement area for a predetermined period. As a fifth modified example, the image generating apparatus 120 may directly generate a virtual viewpoint image into which an advertisement is inserted, based on the images of the specific object, the background and the advertisement, and the respective dispositions thereof in the three-dimensional space. According to such a method, as compared with a case where the virtual viewpoint image in which an advertisement is not inserted and the virtual advertisement image are once generated and then synthesized, it is possible to reduce the whole processing amount of the image generating apparatus 120. As a sixth modified example, the image generating apparatus 120 may output the virtual viewpoint image in which an advertisement is not inserted and information indicating the position of the advertisement area determined by the advertisement area determining unit 407 to an external apparatus. Then, the external apparatus may insert the advertisement into the position of the advertisement area indicated by the information obtained from the image generating apparatus 120, and generate the virtual viewpoint image in which the advertisement has been inserted.

Second Embodiment

Figure 9:
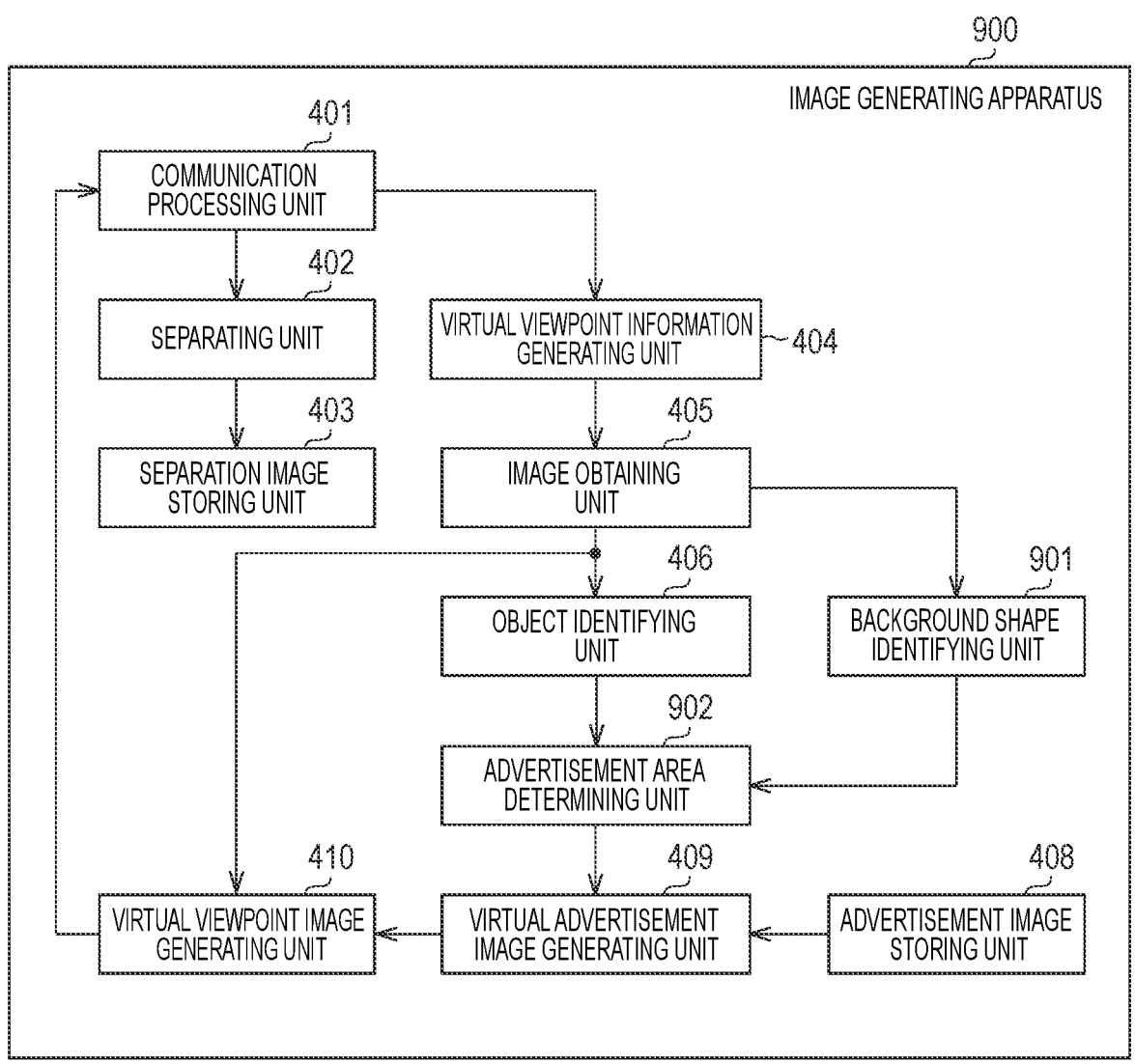
FIG. 9 is a diagram for describing a functional configuration of the image generating apparatus according to a second embodiment.

Next, the image processing system according to the second embodiment will be described. FIG. 9 is a diagram for describing a functional configuration of an image generating apparatus 900 according to the second embodiment. The image generating apparatus 900 further comprises a background shape identifying unit 901 in addition to the configuration of the image generating apparatus 120 of the first embodiment described with reference to FIG. 4.

The background shape identifying unit 901 identifies a shape of the background based on the plurality of background images obtained by the image obtaining unit 405. Then, the background shape identifying unit 901 generates background shape information which indicates the shape of the background such as the disposition of the background, the position information of the feature point, and the like. Incidentally, as a method of identifying the shape of the background, there is a process of identifying the shape including the disposition and the depth of the background by using the three-dimensional image analyzing method with respect to images captured by a plurality of cameras. However, another method may be used. An advertisement area determining unit 902 determines the arrangement position of the advertisement area in the capturing space based on the specific object information generated by the object identifying unit 406, the background shape information, and the virtual viewpoint information.

Figure 10:
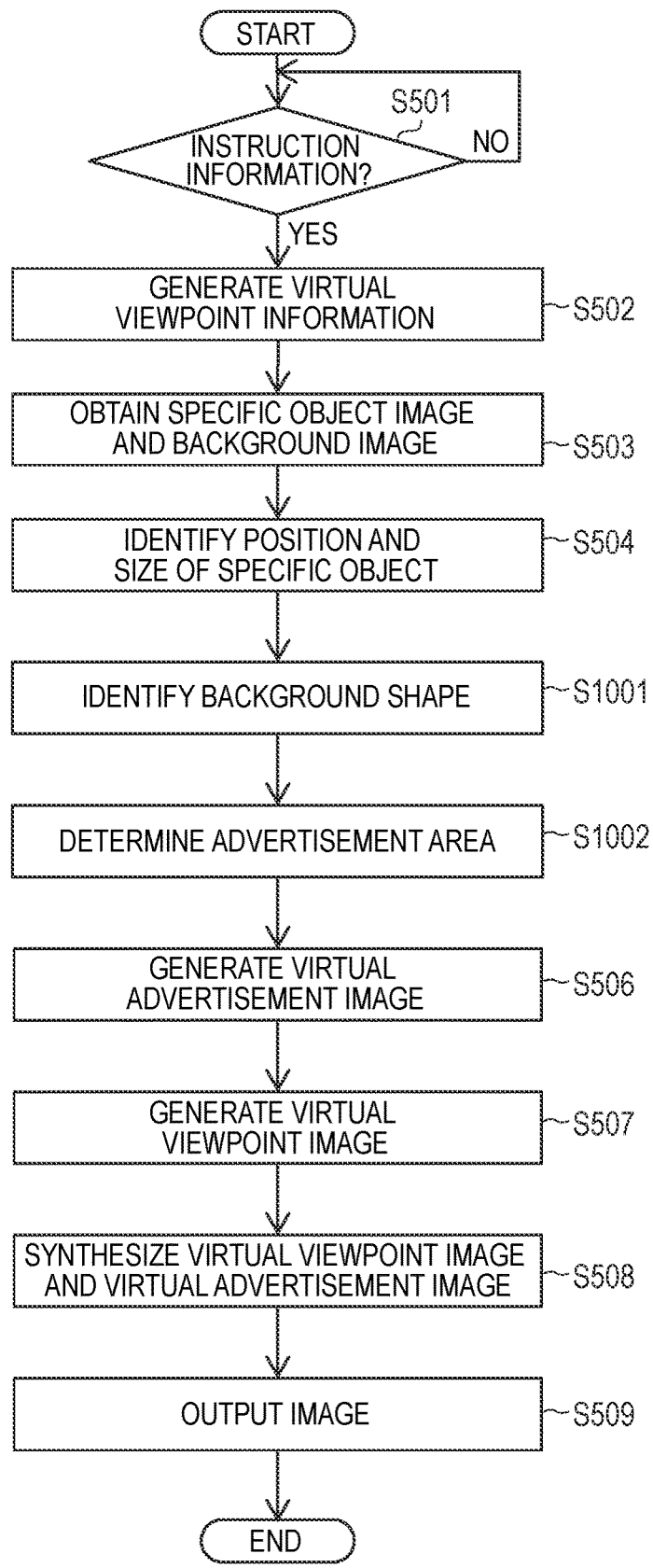
FIG. 10 is a flowchart for describing an image process according to the second embodiment.

FIG. 10 is a flowchart for describing an image process to be performed by the image generating apparatus 900 according to the second embodiment. It should be noted that, among the processes shown in FIG. 10, the same processes as those of the image process shown in FIG. 5 are denoted by the same reference numerals respectively, and the description thereof will be omitted. After the process in S504, in S1001, the background shape identifying unit 901 identifies the shape of the background based on the plurality of background images obtained by the image obtaining unit 405. Then, the background shape identifying unit 901 generates the background shape information which indicates the shape of the background such as the disposition of the background, the position information of the feature point, and the like.

Next, in S1002, the advertisement area determining unit 902 determines the arrangement position of the advertisement area based on the specific object information generated by the object identifying unit 406, the background shape information, and the virtual viewpoint information. More specifically, the advertisement area determining unit 902 first determines a position which does not overlap the specific object as a provisional arrangement position of the advertisement area without considering the shape of the background. Then, the advertisement area determining unit 902 determines a position of a predetermined shape on the straight line passing through the virtual viewpoint and the provisional arrangement position, as the arrangement position. Here, the predetermined shape includes a surface facing the virtual viewpoint side, or the like. The surface facing the virtual viewpoint side includes a wall surface. Besides, as another example, the advertisement area determining unit 902 may project the advertisement area on the background shape such that the virtual viewpoint image seems to face directly when seen from the virtual viewpoint. After the process of S1002, the CPU 301 advances the process to S506.

Figure 11A:
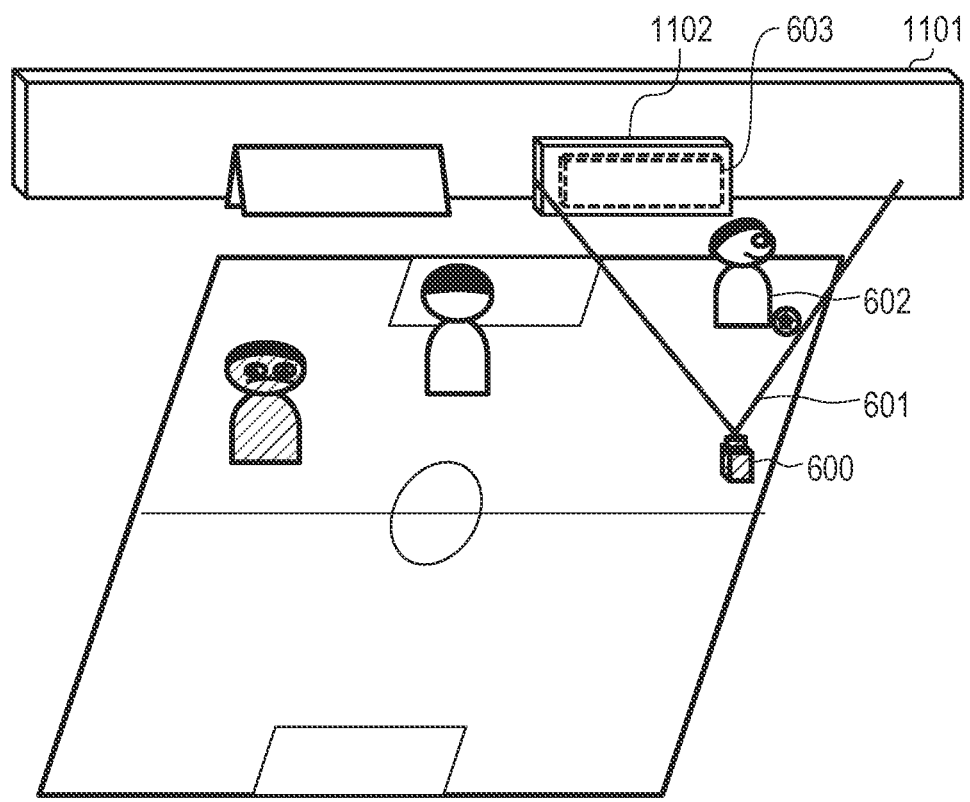
FIG. 11A is an explanatory diagram of an advertisement area determining process.
Figure 11B:
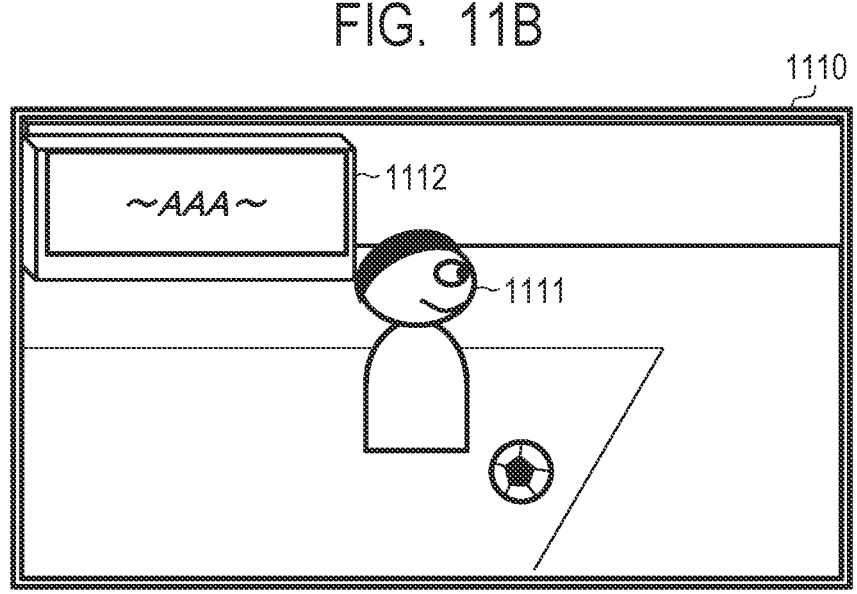
FIG. 11B is an explanatory diagram of the advertisement area determining process.

FIGS. 11A and 11B are explanatory diagrams of the advertisement area determining process (S1002). FIG. 11A conceptually shows the virtual viewpoint 600, the virtual capturing range 601, the specific object 602 and the advertisement area 603. In the background, a wall surface 1101 and a signboard 1102 exist as the background. In this case, the advertisement area determining unit 902 determines the position of the signboard 1102 existing at a position not overlapping the image of the specific object 602 in the virtual viewpoint image, as the position of the advertisement area. FIG. 11B is a diagram for describing a virtual viewpoint image 1110 corresponding to FIG. 11A. In the virtual viewpoint image 1110, a virtual advertisement image 1112 is disposed on the signboard 1102 in the background image on the left side of a specific object image 1111, without overlapping the specific object image 1111.

Besides, in case of a virtual viewpoint of which the capturing direction is overlooking the stadium from just above the stadium, the image generating apparatus 900 determines the ground as the advertisement area. Thus, it is possible to generate the virtual viewpoint image having no adverse effect on competition viewing and having an advertisement effect. Incidentally, other configurations and processes of the image processing system according to the second embodiment are similar to those of the image processing system according to the first embodiment.

As described above, in the second embodiment, the image generating apparatus 900 determines the position of the advertisement area in consideration of the shape of the background. Therefore, it is possible to prevent that the virtual advertisement image is disposed behind the background such as the wall, the signboard or the like, depending on the position and shape of the background. Besides, since the image generation apparatus 900 determines the arrangement position of the advertisement area based on the three-dimensional shape such as the wall surface, the signboard and the like of the background, it is possible to generate a virtual viewpoint image for which the user does not feel uncomfortable.

Third Embodiment

Figure 12:
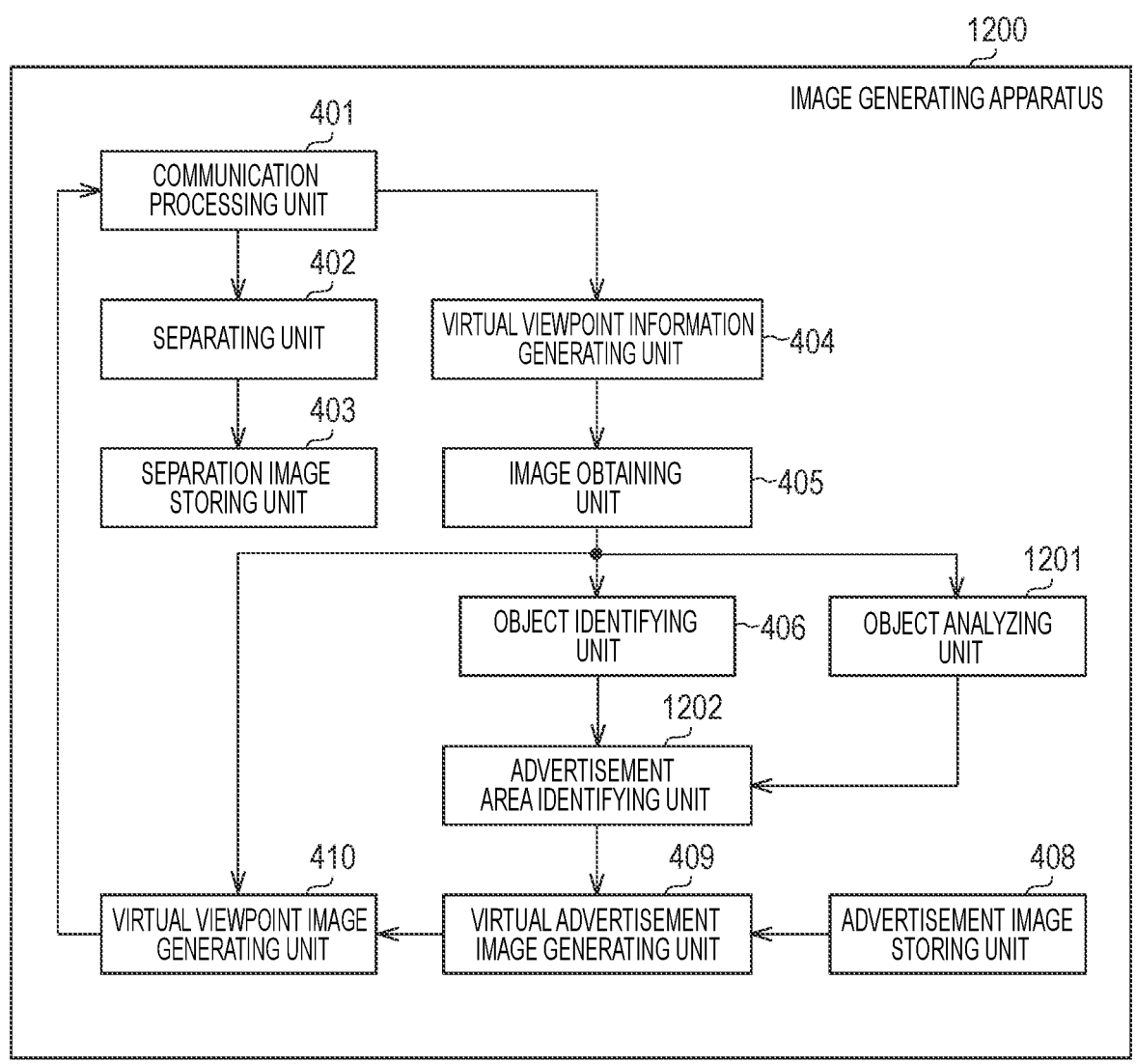
FIG. 12 is a diagram for describing a functional configuration of the image generating apparatus according to a third embodiment.

Next, the image processing system according to the third embodiment will be described. FIG. 12 is a diagram for describing a functional configuration of an image generating apparatus 1200 according to the third embodiment. The image generating apparatus 1200 further comprises an object analyzing unit 1201 in addition to the configuration of the image generating apparatus 120 of the first embodiment described with reference to FIG. 4. Based on the virtual viewpoint information generated by the virtual viewpoint information generating unit 404, the object analyzing unit 1201 generates a virtual viewpoint image not including an advertisement image. Then, the object analyzing unit 1201 calculates a percentage of the size of the specific object image to the whole virtual viewpoint image, and generates percentage information indicating the calculated percentage.

An advertisement area determining unit 1202 determines an arrangement position of the advertisement area in the capturing space based on the virtual viewpoint information, the specific object information, and the percentage information. Incidentally, in the present embodiment, it is assumed that an initial position of the advertisement area is preset. With reference to the initial position, the advertisement area determining unit 1202 determines the position in the capturing direction based on the percentage information.

For example, it is assumed that the whole virtual viewpoint image is the area of (0, 0) to (1920, 1080) dots and the specific object image is the area of (960, 0) to (1560, 1080) dots. In this case, when the percentage exceeds a preset threshold such as 30% or the like, the advertisement area determining unit 1202 determines a rear position by a predetermined distance from the initial position in the capturing direction, as the arrangement position of the advertisement area. Here, for example, the predetermined distance is a distance which doubles the distance from the virtual viewpoint. Incidentally, when determining the arrangement position of the advertisement area, the advertisement area determining unit 1202 may use a relational expression indicating the relationship between the percentage and the arrangement position of the advertisement area. As another example, the advertisement area determining unit may use a correspondence table on which the percentage and the arrangement position of the advertisement area are associated with each other.

Figure 13:
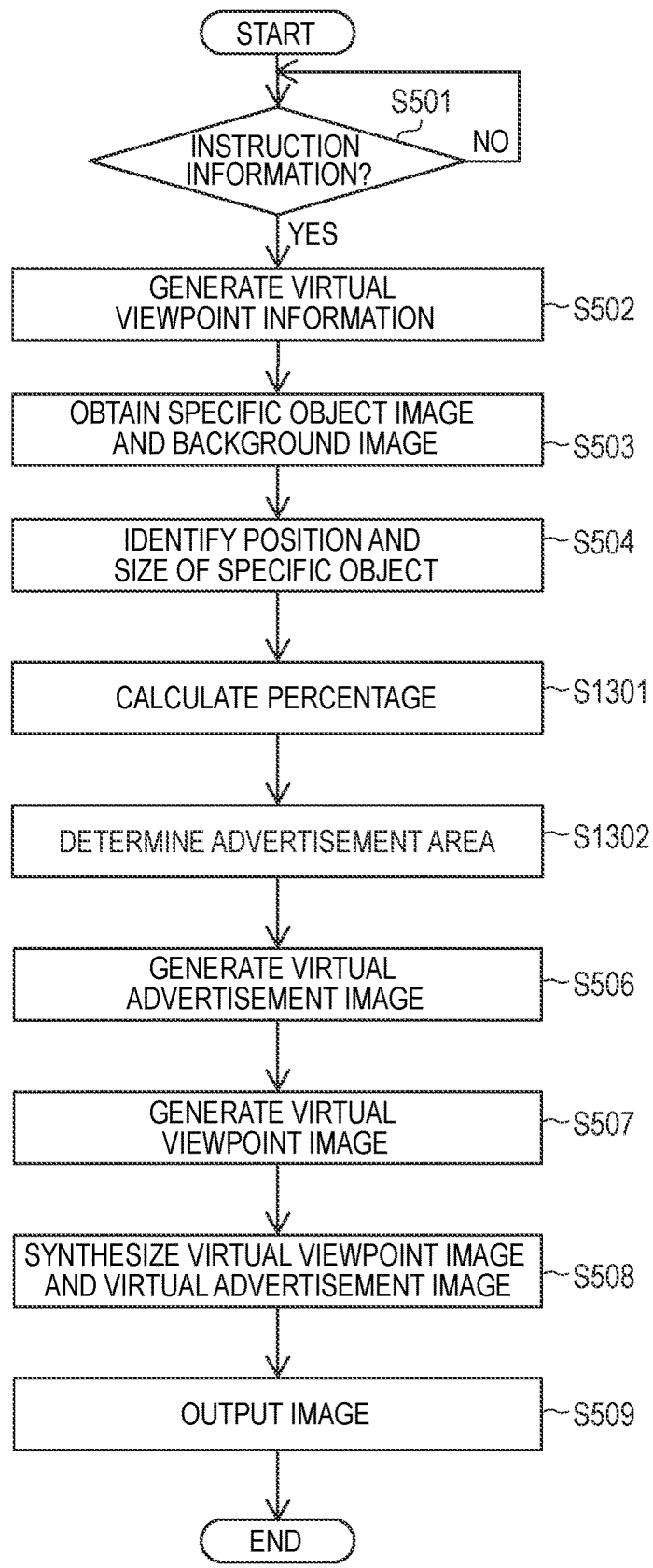
FIG. 13 is a flowchart for describing an image process according to the third embodiment.

FIG. 13 is a flowchart for describing an image process to be performed by the image generating apparatus 1200 according to the third embodiment. It should be noted that, among the processes shown in FIG. 13, the same processes as those of the image process shown in FIG. 5 are denoted by the same reference numerals respectively, and the description thereof will be omitted. After the process in S504, in S51301, the object analyzing unit 1201 generates a virtual viewpoint image not including an advertisement image based on the virtual viewpoint information. Then, the object analyzing unit 1201 calculates a percentage of the size of the specific object image to the whole virtual viewpoint image, and generates percentage information indicating the calculated percentage.

Next, in S1302, the advertisement area determining unit 1202 determines the arrangement position of the advertisement area in the captured image, based on the virtual viewpoint information, the specific object information, and the percentage information. Thereafter, the CPU 301 advances the process to S506. Other configurations and processes of the image processing system according to the third embodiment are similar to those of the image processing system according to another embodiment.

As described above, in the third embodiment, the image generating apparatus 1200 determines the arrangement position of the advertisement area based on the percentage of the specific object image to the whole image. Therefore, for example, as in the virtual viewpoint image 820 shown in FIG. 8B, even when the specific object moves toward the virtual viewpoint and the specific object image becomes large, it is possible to dispose the virtual advertisement image to a position not overlapping the specific object image. Besides, even for viewpoint zooming, it is possible to dispose the virtual advertisement image at a position not overlapping the specific object image in the virtual viewpoint image to be operated by the user.

Fourth Embodiment

Figure 14:
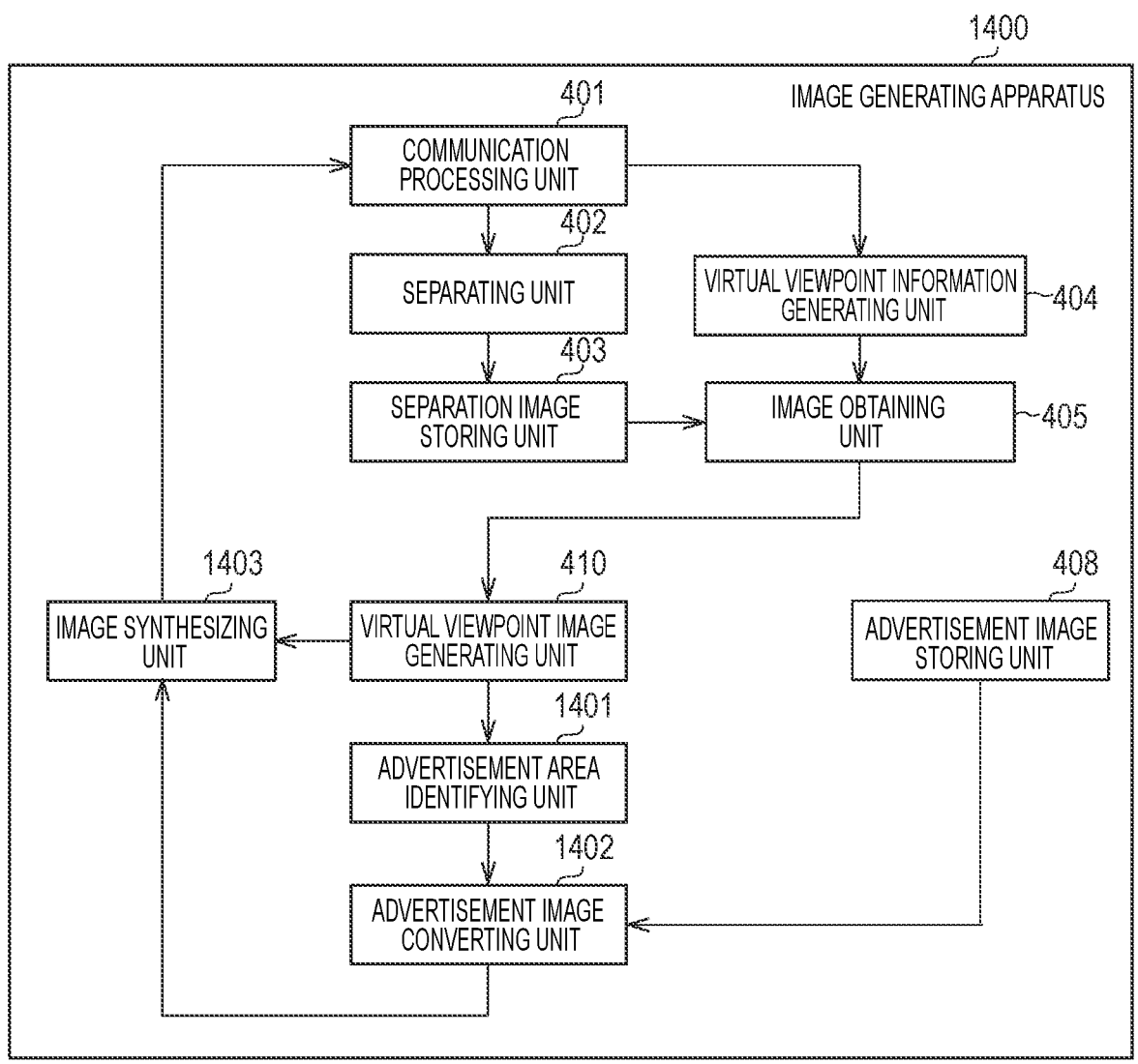
FIG. 14 is a diagram for describing a functional configuration of the image generating apparatus according to a fourth embodiment.

Next, the image processing system according to the fourth embodiment will be described. FIG. 14 is a diagram for describing a functional configuration of an image generating apparatus 1400 according to the fourth embodiment. The image generating apparatus 1400 comprises an advertisement area identifying unit 1401, an advertisement image converting unit 1402 and an image synthesizing unit 1403, instead of the object identifying unit 406, the advertisement area determining unit 407 and the virtual advertisement image generating unit 409 of the image generating apparatus 120 according to the first embodiment.

The advertisement area identifying unit 1401 identifies whether or not the advertisement area is included in the virtual viewpoint image generated by the virtual viewpoint image generating unit 410. More specifically, the advertisement area identifying unit 1401 identifies the advertisement area in the virtual viewpoint image by performing two-dimensional projection transformation to a predetermined advertisement area in a three-dimensional virtual viewpoint space based on the virtual viewpoint information. Incidentally, it is assumed that a position, a size and a shape of the advertisement area in the virtual viewpoint space are preset. In the present embodiment, it is assumed that the advertisement area is a rectangle, and the width and the height thereof are set as the size and the shape. When the advertisement area is included in the virtual viewpoint image, the advertisement area identifying unit 1401 generates advertisement area information indicating the position, the width and the height of the advertisement area with respect to the whole virtual viewpoint image. It should be noted that one or more advertisement areas may be set in the virtual viewpoint space. As another example, the advertisement area may be dynamically set according to the virtual viewpoint.

Besides, the process to be performed by the advertisement area identifying unit 1401 for identifying the advertisement area is not limited to that in the embodiment. As another example, a predetermined pattern object such as, e.g., QR code™ (Quick Response code) is disposed in the advertisement area. Then, the advertisement area identifying unit 1401 may identify the advertisement area depending on whether or not a predetermined pattern exists in the virtual viewpoint image. The method of setting the advertisement area and the method of identifying the advertisement area are not limited to those described in the embodiment.

Based on the advertisement area information generated from the advertisement area identifying unit 1401 and the advertisement image stored in the advertisement image storing unit 408, the advertisement image converting unit 1402 converts the advertisement image size so as to be held within the range of the advertisement area information, and generates the converted advertisement image. Incidentally, in the present embodiment, an initial size including the width and the height of the advertisement image is preset. When the advertisement image size is held within the width and the height of the advertisement area information generated by the advertisement area identifying unit 1401, the advertisement image converting unit 1402 uses the advertisement image of the initial size as the converted advertisement image. On the other hand, when the initial size of the advertisement image is not held within the advertisement area indicated by the advertisement area information, the advertisement image converting unit 1402 reduces the advertisement image so as to be held within the advertisement area indicated by the advertisement area information.

As another example, the advertisement image converting unit 1402 may determine the largeness (size) of the advertisement image (virtual advertisement) based on a positional relationship between the three-dimensional position of the virtual viewpoint and the position of the advertisement area. The process for adjusting the size of the advertisement image according to the advertisement area is not limited to that in the embodiment. As another example, the image generating apparatus 1400 may previously hold a plurality of advertisement images of different sizes in the advertisement image storing unit 408, and read out an advertisement image of a size held within the advertisement area based on the advertisement area information. As just described, the method of converting the advertisement image is not limited to that in the embodiment.

The image synthesizing unit 1403 synthesizes the virtual viewpoint image generated by the virtual viewpoint image generating unit 410 and the converted advertisement image generated by the advertisement image converting unit 1402 to generate an advertisement-synthesized virtual viewpoint image. That is, the image synthesizing unit 1403 superimposes the advertisement image on a designated area based on the advertisement area information of the virtual viewpoint image, thereby generating the advertisement-synthesized virtual viewpoint image. The advertisement-synthesized virtual viewpoint image generated by the image synthesizing unit 1403 is converted into a transmission signal capable of being transmitted by the communication processing unit 401, and transmitted to the terminal apparatus 130.

Figure 15:
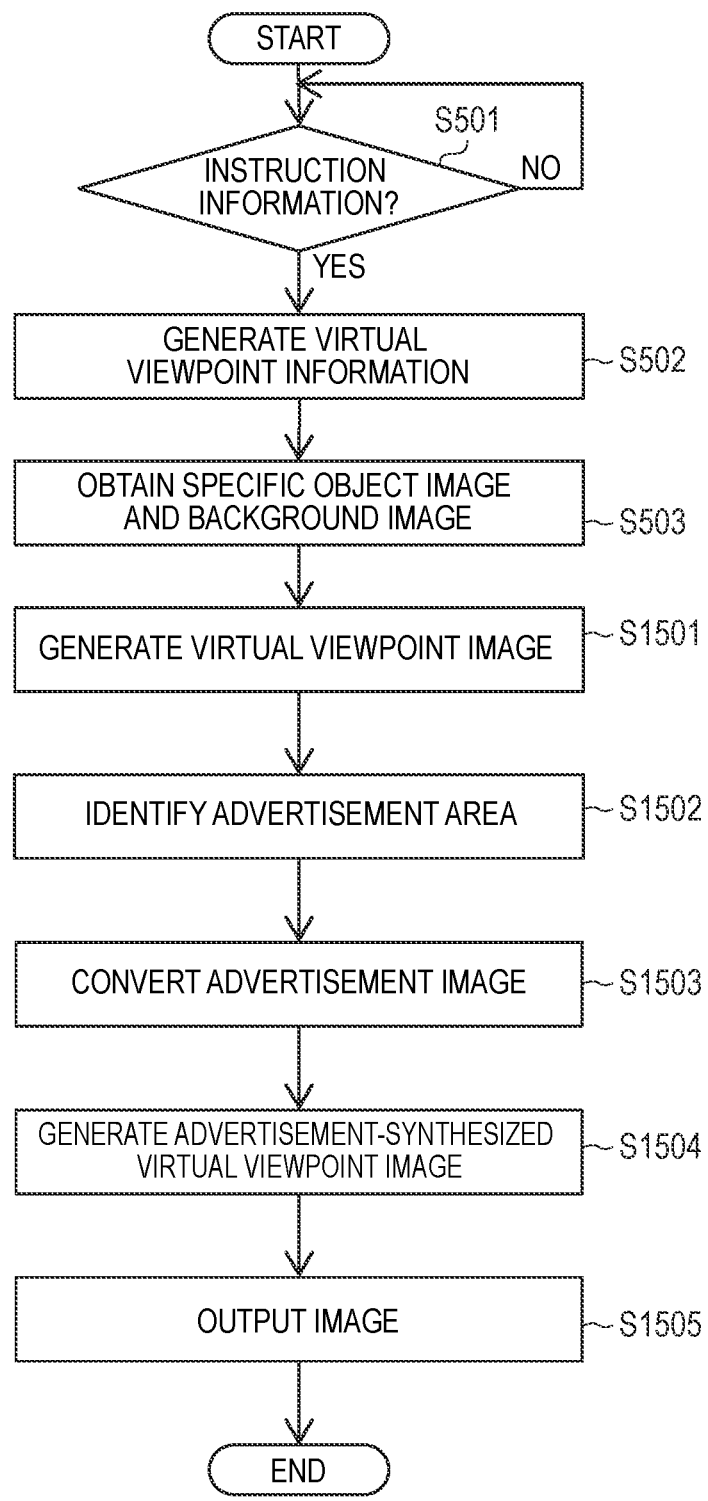
FIG. 15 is a flowchart for describing an image process according to the fourth embodiment.

FIG. 15 is a flowchart for describing an image process to be performed by the image generating apparatus 1400 according to the fourth embodiment. It should be noted that, among the processes shown in FIG. 15, the same processes as those of the image process shown in FIG. 5 are denoted by the same reference numerals respectively, and the description thereof will be omitted. After the process in S503, in S1501, the virtual viewpoint image generating unit 410 generates a virtual viewpoint image based on the specific object image and the background image obtained by the image obtaining unit 405. Next, in S1502, the advertisement area identifying unit 1401 identifies the advertisement area in the virtual viewpoint image. Next, in S1503, the advertisement image converting unit 1402 converts the size of the advertisement image based on the advertisement area information generated by the advertisement area identifying unit 1401 and the advertisement image stored in the advertisement image storing unit 408, thereby obtaining the converted advertisement image. The advertisement image converting unit 1402 reduces the size of the advertisement image such that the advertisement image is held within the range of the advertisement area information.

Next, in S1504, the image synthesizing unit 1403 superimposes (synthesizes) the converted advertisement image obtained in S1503 on the designated area of the virtual viewpoint image, thereby generating the advertisement-synthesized virtual viewpoint image in which the advertisement is disposed. Next, in S1505, the communication processing unit 401 transmits (outputs) the advertisement-synthesized virtual viewpoint image (display image) obtained in S1504 to the terminal apparatus 130. Thus, the image process ends.

Figure 16:
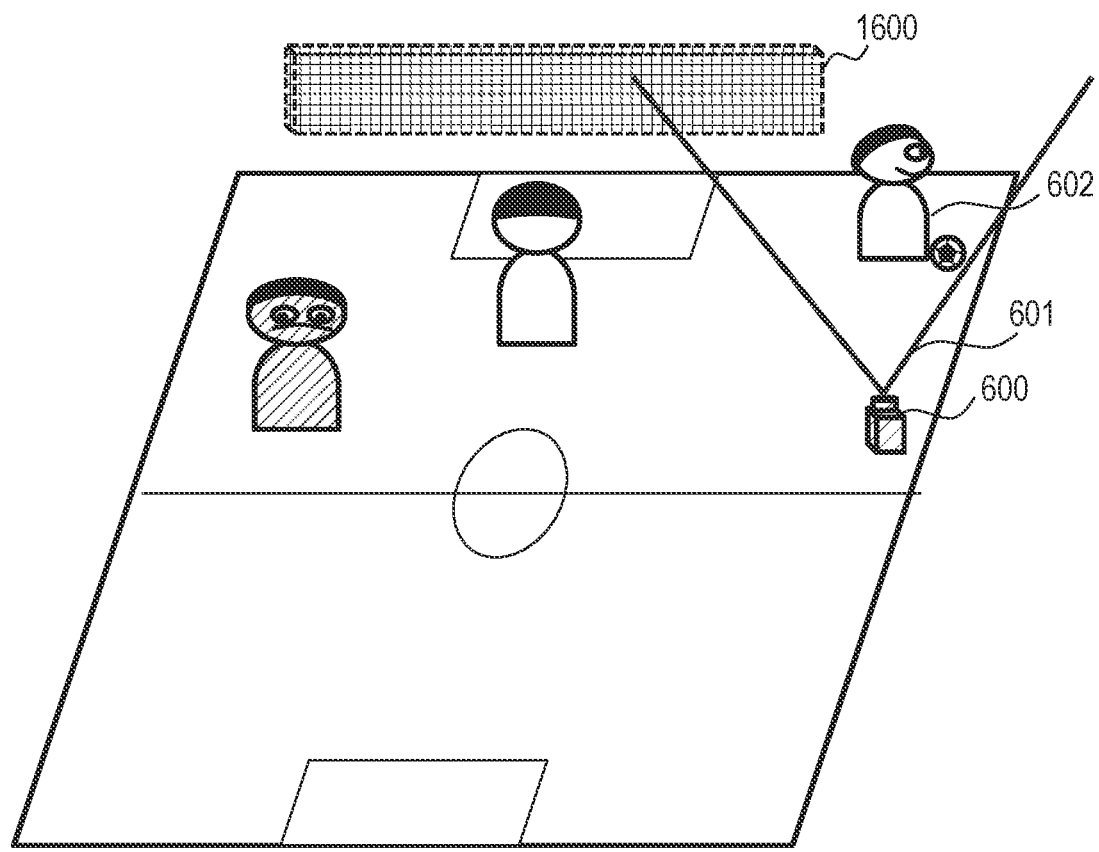
FIG. 16 is an explanatory diagram of an advertisement area identifying process according to the fourth embodiment.
Figure 17:
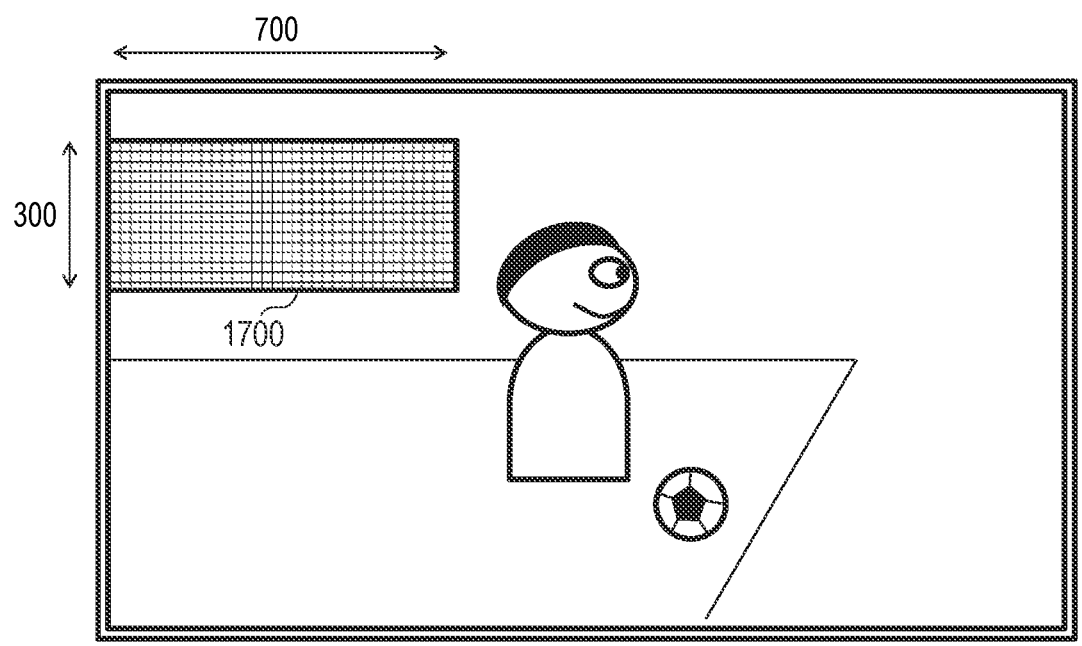
FIG. 17 is an explanatory diagram of the advertisement area identifying processing according to the fourth embodiment.

FIG. 16 and FIG. 17 are explanatory diagrams of the advertisement area identifying process (S1502). FIG. 16 conceptually shows the virtual viewpoint 600, the virtual capturing range 601, the specific object 602, and an advertisement area 1600. FIG. 17 shows a virtual viewpoint image obtained from the virtual viewpoint 600 of FIG. 16. For example, in the virtual viewpoint image obtained from the virtual viewpoint information of the virtual viewpoint 600, it is assumed that the whole virtual viewpoint image is an area of (0, 0) to (1920, 1080) dots whose origin is the upper left. In this case, by the two-dimensional projection transformation from the virtual viewpoint space to the virtual viewpoint image, an area of position (0, 100), width 700 and height 300 is identified as an advertisement area 1700.

Figure 18A:
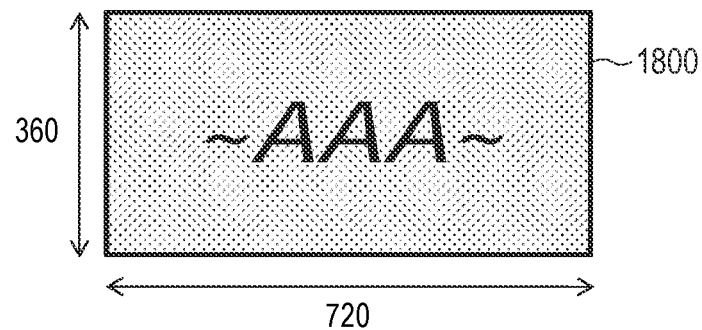
FIG. 18A is an explanatory diagram of a generating process of an advertisement-synthesized virtual viewpoint image according to the fourth embodiment.
Figure 18B:
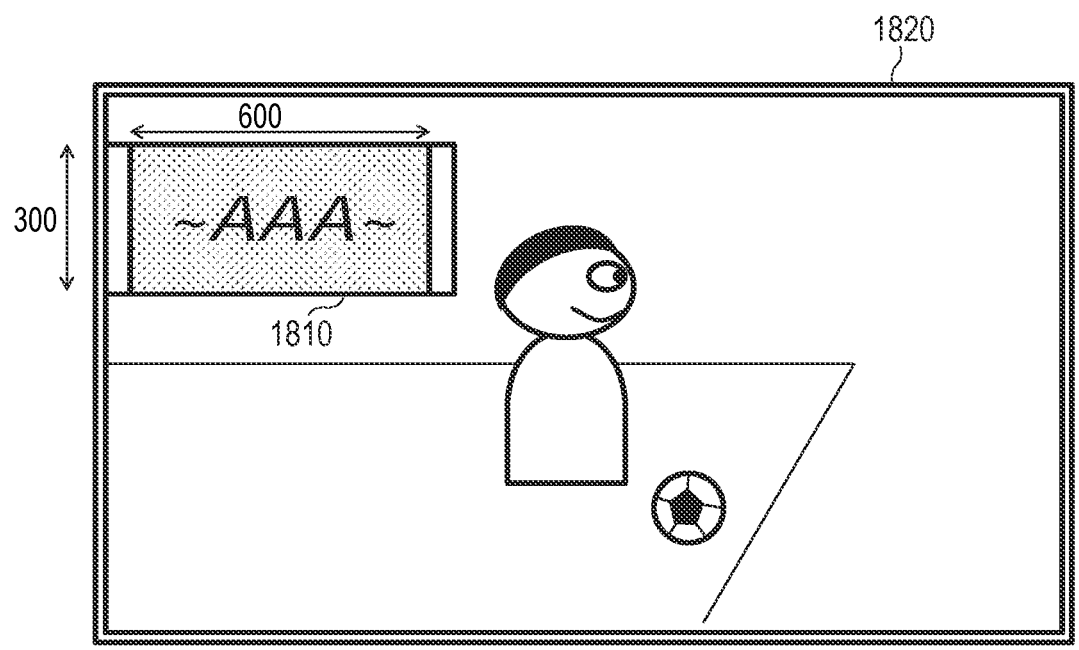
FIG. 18B is an explanatory diagram of the generating process of the advertisement-synthesized virtual viewpoint images according to the fourth embodiment.

FIGS. 18A and 18B are explanatory diagrams of the advertisement image converting process (S1503) and the generating process of the advertisement-synthesized virtual viewpoint image (S1504). As shown in FIG. 18A, it is assumed that an advertisement image 1800 is an image with width 720 and height 360. It is assumed that the advertisement area identified in S1502 is an area of width 700 and height 300 as shown in FIG. 17. In this case, the advertisement image converting unit 1402 reduces the advertisement image to a size which is held within in the advertisement area while maintaining the aspect ratio of the advertisement image. More specifically, the converted advertisement image having width 600 and height 300 is generated. Then, as shown in FIG. 18B, by synthesizing a converted advertisement image 1810 at the position (0, 100) of the virtual viewpoint image, an advertisement-synthesized virtual viewpoint image 1820 is generated.

In the present embodiment, the image synthesizing unit 1403 disposes the advertisement image with the center of the advertisement area as the reference. However, the advertisement image may be disposed within the advertisement area, and the disposition of the advertisement image is not limited to that in the embodiment. As another example, the image synthesizing unit 1403 may dispose the advertisement image such that the upper left vertex of the advertisement area and the upper left vertex of the advertisement image coincide with each other. Besides, the advertisement image converting unit 1402 does not necessarily need to maintain the aspect ratio in the conversion of the advertisement image size. Namely, the advertisement image converting unit may convert only one of the vertical and horizontal directions, or may reduce the vertical and horizontal directions respectively at different magnifications.

As described above, the image generation apparatus 1400 according to the fourth embodiment disposes the virtual advertisement image in the advertisement area included in the virtual viewpoint image. More specifically, based on the position and the size of the advertisement area of the virtual viewpoint image, the image generating apparatus 120 converts the advertisement image so as to be within the advertisement area, synthesizes the virtual viewpoint image and the converted advertisement image, and displays the synthesized image. According to the above constitution, it is possible to add the advertisement image after generating the virtual viewpoint image, and it is thus possible to add the advertisement image with a simpler constitution and configuration.

Incidentally, it should be noted that the methods respectively described in the second and third embodiments may be applied to the fourth embodiment. More specifically, the advertisement image may be converted based on a movement direction of the specific object, or a size occupied by the image of the specific object in the virtual viewpoint image.

Further, the method of controlling the size of the advertisement image is not limited to the method of directly controlling the size of the advertisement image in the two-dimensional virtual viewpoint image. Namely, it may possible to control the size of the advertisement image in the three-dimensional space and generate the virtual viewpoint image based on such a control result. For example, in the advertisement areas predetermined in the three-dimensional space and the advertisement area determined based on the virtual viewpoint and the position of the specific object, the image generating apparatus identifies a partial area included in the field of view of the virtual viewpoint (a part included in the virtual viewpoint image). Such identification of the partial area is performed based on, for example, the three-dimensional position of the virtual viewpoint and the three-dimensional position of the advertisement area. Then, the image generating apparatus determines the size and the content of the advertisement image such that the advertisement image is held within the identified partial area, and disposes the advertisement image in the partial area. Then, the image generating apparatus may generate the virtual viewpoint image based on the captured image, the virtual viewpoint information, and the position, the size and the content of the advertisement image in the three-dimensional space. According to such a method, for example, it is possible to include the whole advertisement image in the virtual viewpoint image, so that an advertisement effect can be enhanced as compared with a case where only a part of the advertisement image is included in the virtual viewpoint image.

Besides, the image generating apparatus may previously hold, in addition to the sizes of the advertisement image, advertisement images different in advertisement contents in the advertisement image storing unit 408, and may read different advertisement images based on the advertisement area information. Here, the advertisement content is advertisement information including a company name logo, a product logo, a product image, a logo mark and an image. For example, as the advertisement area becomes smaller, less advertisement information is read out. As another example, the image generating apparatus may determine the content of the virtual advertisement based on the positional relationship between the three-dimensional position of the virtual viewpoint and the position of the advertisement area.

In each of the above embodiments, the advertisement image and the virtual viewpoint image are synthesized by disposing the advertisement area displaying the advertisement image in the capturing space. However, the image generating apparatus only has to synthesize the virtual object not included in the captured image by the image capturing apparatus 110 and the virtual viewpoint image, and the virtual object is not limited to the advertisement image. For example, the virtual object to be synthesized may be additional information such as an image showing information related to the progress of a capturing-target game, an image showing statistical information related to a game, character and image describing a subject such as a person, an image showing biometric information of a subject person, and the like.

As just described, although the examples of the embodiments of the present invention have been described in detail, the present invention is not limited to the specific embodiments. That is, various modifications and changes are possible within the scope of the gist of the present invention described in the later-described claims.

According to the present invention, it is possible to reduce a possibility that a subject (specific object) of a virtual viewpoint image and a virtual object area overlap each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
one or more hardware processors; and
one or more memories storing one or more programs configured to be executed by the one or more hardware processors, the one or more programs including instructions for:
(1) obtaining image data based on a plurality of captured images captured by a plurality of image capturing apparatuses;
(2) obtaining viewpoint information indicating (a) a position of a virtual viewpoint and (b) a direction of view from the virtual viewpoint in a three-dimensional space;
(3) determining a content of a virtual object which is to be included in a virtual viewpoint image corresponding to the viewpoint information and which does not exist in an area captured by the plurality of image capturing apparatuses, based on a relationship between (a) the position of the virtual viewpoint indicated by the viewpoint information, (b) a position of the virtual object in the three-dimensional space, and (c) a position and a size of a specific object based on the obtained image data, the specific object being captured in the obtained image data;
(4) reducing a size of an advertisement image corresponding to the content of the virtual object such that the advertisement image is displayed within a region corresponding to the virtual object in the virtual viewpoint image;
(5) generating the virtual viewpoint image including the virtual object having the determined content based on the image data and the viewpoint information; and
(6) changing, in a case where the relationship has changed, an amount of information of the content of a virtual object without changing an advertiser of the advertisement image based on the changed relationship so as to include in the virtual viewpoint image a whole area of the content of the virtual object.

2. The image processing apparatus according to claim 1, wherein the one or more programs further include instructions for obtaining object information related to the virtual object having the determined content based on the relationship.

3. The image processing apparatus according to claim 2, wherein the object information is obtained from a plurality of kinds of object information.

4. The image processing apparatus according to claim 1, wherein the content of the virtual object includes at least one of a company logo, a product logo, and a product image.

5. The image processing apparatus according to claim 1, wherein the content of the virtual object includes at least one of information related to a progress of a capturing target game, statistical information related to a game, information describing a person, and biometric information of a person.

6. The image processing apparatus according to claim 1, wherein a size of a region corresponding to the virtual object in the virtual viewpoint image is determined based on a distance between (a) the position of the virtual viewpoint indicated by the viewpoint information and (b) the position of the virtual object in the three-dimensional space.

7. The image processing apparatus according to claim 6, wherein where (1) a first case is a case where the size of the region corresponding to the virtual object in the virtual viewpoint image is a first size and (2) a second case is a case where the size of the region corresponding to the virtual object in the virtual viewpoint image is a second size that is smaller than the first size, the content of the virtual object is determined such that information presented by the content of the virtual object in the second case is less than information presented by the content of the virtual object in the first case.

8. The image processing apparatus according to claim 1, wherein where (1) a first case is a case where a distance between the position of the virtual viewpoint and the position of the virtual object is a first distance and (2) a second case is a case where a distance between the position of the virtual viewpoint and the position of the virtual object is a second distance that is shorter than the first distance, the content of the virtual object is determined such that information presented by the content of the virtual object in the first case is less than information presented by the content of the virtual object in the second case.

9. The image processing apparatus according to claim 1, wherein the one or more programs further include instructions for obtaining object information indicating the position of the virtual object in the three-dimensional space, and
wherein the content of the virtual object is determined based on the relationship between (a) the position of the virtual viewpoint indicated by the viewpoint information, (b) the position of the virtual object indicated by the object information, and (c) the position and the size of the specific object.

10. The image processing apparatus according to claim 1, wherein the position of the virtual viewpoint and the position of the virtual object in the three-dimensional space are defined by a three-dimensional coordinate system corresponding to an area captured by the plurality of image capturing apparatuses.

11. The image processing apparatus according to claim 1, wherein at least one of a size and a shape of the virtual object in the virtual viewpoint image changes based on the relationship.

12. The image processing apparatus according to claim 1, wherein the amount of information of the content of the virtual object is changed by changing a number of pixels of at least one of a width and a height of an image so that the whole area of the content of the virtual object is included in the virtual viewpoint image.

13. The image processing apparatus according to claim 1, wherein the amount of information of the content of the virtual object is changed by selecting one of a plurality of images of different sizes stored in a storage unit, the selection being carried out so that the whole area of the content of the virtual object is included in the virtual viewpoint image.

14. An image processing method comprising:
obtaining image data based on a plurality of captured images captured by a plurality of image capturing apparatuses;
obtaining viewpoint information indicating (a) a position of a virtual viewpoint and (b) a direction of view from the virtual viewpoint in a three-dimensional space;
determining a content of a virtual object which is to be included in a virtual viewpoint image corresponding to the viewpoint information and which does not exist in an area captured by the plurality of image capturing apparatuses, based on a relationship between (a) the position of the virtual viewpoint indicated by the viewpoint information, (b) a position of the virtual object in the three-dimensional space, and (c) a position and a size of a specific object based on the obtained image data, the specific object being captured in the obtained image data;
reducing a size of an advertisement image corresponding to the content of the virtual object such that the advertisement image is displayed within a region corresponding to the virtual object in the virtual viewpoint image;
generating the virtual viewpoint image including the virtual object having the determined content based on the image data and the viewpoint information; and
changing, in a case where the relationship has changed, an amount of information of the content of a virtual object without changing an advertiser of the advertisement image based on the changed relationship so as to include in the virtual viewpoint image a whole area of the content of the virtual object.

15. The image processing method according to claim 14, wherein a size of a region corresponding to the virtual object in the virtual viewpoint image is determined based on a distance between (a) the position of the virtual viewpoint indicated by the viewpoint information and (b) the position of the virtual object in the three-dimensional space.

16. The image processing method according to claim 15, wherein where (1) a first case is a case where the size of the region corresponding to the virtual object in the virtual viewpoint image is a first size and (2) a second case is a case where the size of the region corresponding to the virtual object in the virtual viewpoint image is a second size that is smaller than the first size, the content of the virtual object is determined such that information presented by the content of the virtual object in the second case is less than information presented by the content of the virtual object in the first case.

17. The image processing method according to claim 14, wherein where (1) a first case is a case where a distance between the position of the virtual viewpoint and the position of the virtual object is a first distance and (2) a second case is a case where a distance between the position of the virtual viewpoint and the position of the virtual object is a second distance that is shorter than the first distance, the content of the virtual object is determined such that information presented by the content of the virtual object in the first case is less than information presented by the content of the virtual object in the second case.

18. A non-transitory computer-readable storage medium which stores a program for causing a computer to execute a method, the method comprising:
obtaining image data based on a plurality of captured images captured by a plurality of image capturing apparatuses;
obtaining viewpoint information indicating (a) a position of a virtual viewpoint and (b) a direction of view from the virtual viewpoint in a three-dimensional space;
determining a content of a virtual object which is to be included in a virtual viewpoint image corresponding to the viewpoint information and which does not exist in an area captured by the plurality of image capturing apparatuses, based on a relationship between (a) the position of the virtual viewpoint indicated by the viewpoint information, (b) a position of the virtual object in the three-dimensional space, and (c) a position and a size of a specific object based on the obtained image data, the specific object being captured in the obtained image data;
reducing a size of an advertisement image corresponding to the content of the virtual object such that the advertisement image is displayed within a region corresponding to the virtual object in the virtual viewpoint image;
generating the virtual viewpoint image including the virtual object having the determined content based on the image data and the viewpoint information; and
changing, in a case where the relationship has changed, an amount of information of the content of a virtual object without changing an advertiser of the advertisement image based on the changed relationship so as to include in the virtual viewpoint image a whole area of the content of the virtual object.

* * * * *